(12) United States Patent
Imaseki et al.

(10) Patent No.: US 7,494,730 B2
(45) Date of Patent: Feb. 24, 2009

(54) APPARATUS FOR COOLING FUEL CELL

(75) Inventors: Mitsuharu Imaseki, Saitama (JP); Yoshiro Shimoyama, Saitama (JP); Takatsugu Koyama, Saitama (JP); Teruaki Kawasaki, Saitama (JP); Akio Yamamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 573 days.

(21) Appl. No.: 10/826,016

(22) Filed: Apr. 15, 2004

(65) Prior Publication Data

US 2004/0265654 A1 Dec. 30, 2004

(30) Foreign Application Priority Data

Apr. 15, 2003 (JP) ............... 2003-110157
Apr. 30, 2003 (JP) ............... 2003-125964

(51) Int. Cl.
*H01M 8/00* (2006.01)

(52) U.S. Cl. ............... 429/13; 429/25; 429/26; 429/20; 429/39

(58) Field of Classification Search ............ 429/39, 429/34, 13, 26, 20
See application file for complete search history.

(56) References Cited

U.S. PATENT DOCUMENTS

| | | | |
|---|---|---|---|
| 4,923,768 A * | 5/1990 | Kaneko et al. ........ | 429/19 |
| 2001/0019789 A1 * | 9/2001 | Hirakata ............. | 429/26 |
| 2002/0061426 A1 | 5/2002 | Imaseki et al. | |
| 2002/0189873 A1 * | 12/2002 | Mizuno .............. | 180/65.3 |
| 2003/0224226 A1 * | 12/2003 | Jia et al. ........... | 429/13 |

FOREIGN PATENT DOCUMENTS

| | | |
|---|---|---|
| JP | 2001-250570 | 9/2001 |
| JP | 2001-2250570 | 9/2001 |
| JP | 2002-124269 | 4/2002 |
| JP | 2002-134138 | 5/2002 |

OTHER PUBLICATIONS

Japanese Office Action for Application No. 2003-110157, dated Jul. 26, 2007.

* cited by examiner

*Primary Examiner*—Patrick Ryan
*Assistant Examiner*—Ben Lewis
(74) *Attorney, Agent, or Firm*—Lahive & Cockfield, LLP; Anthony A. Laurentano, Esq.

(57) ABSTRACT

An apparatus for cooling a fuel cell, which generates power by supplying air and a fuel gas, in which a cooling liquid is circulated between the fuel cell and a heat exchanger is disclosed. The cooling apparatus of the present invention separates the gas introduced into the cooling liquid, mixes the separated gas with the air supplied to or exhausted from the fuel cell, and then exhausts the gas.

17 Claims, 9 Drawing Sheets

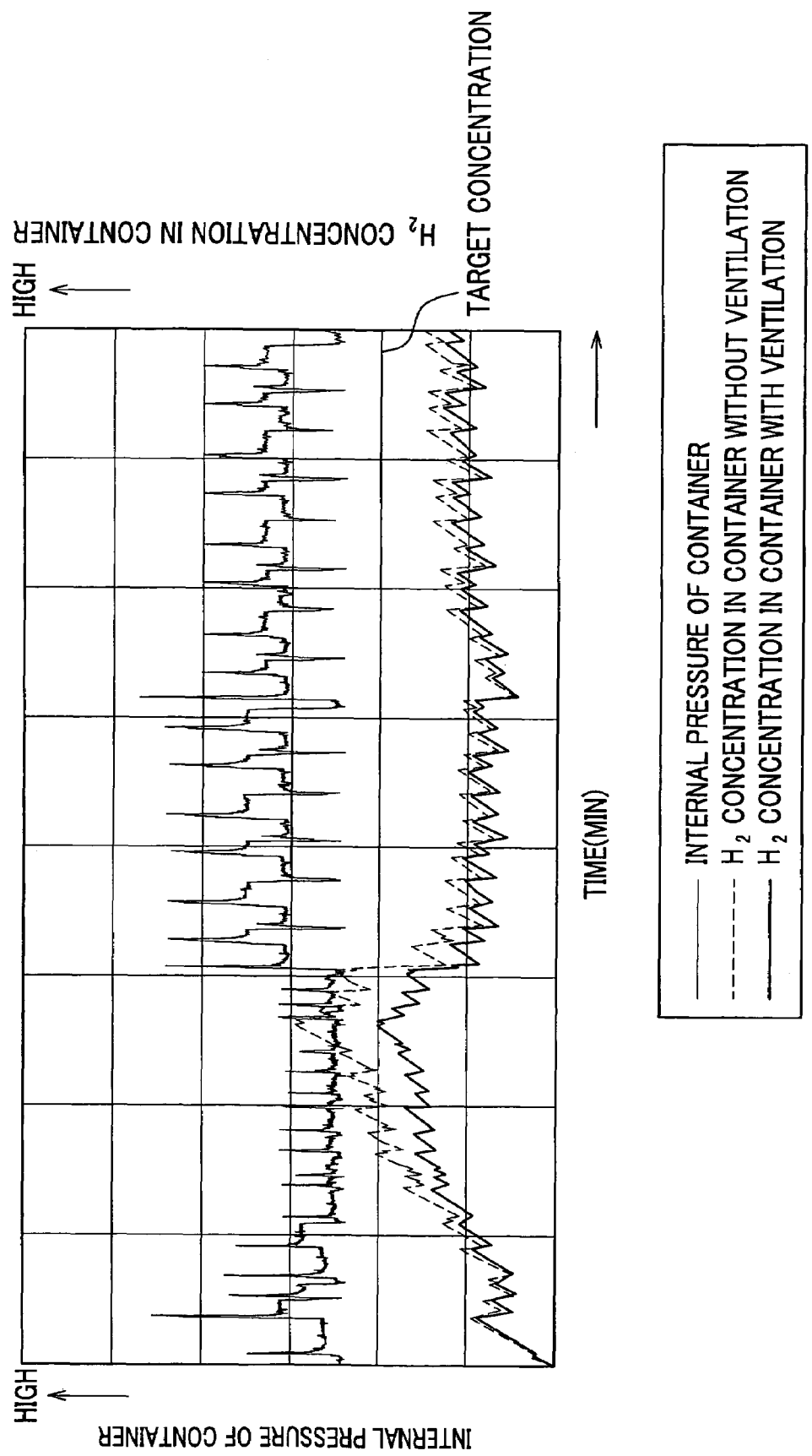

APPARATUS FOR COOLING FUEL CELL

BACKGROUND ARTS

1. Field of the Invention

The present invention relates to an apparatus for cooling a fuel cell. More particularly, the present invention relates to an apparatus for cooling a fuel cell in which gases contaminated in a cooling liquid of the fuel cell is separated, and then exhausted.

2. Description of the Prior Art

In recent years, a polymer electrode fuel cell (hereinafter referred to as "PEFC") attracted as a power source for an electric automobile can generate power even at a normal temperature, and has increasingly been put into various practical applications.

Generally, PEFC composed of a plurality of fuel cells placed, the fuel cell being formed by sectioning one side of a polymer electrolyte membrane into a cathode electrode, and sectioning another side of the polymer electrode membrane into an anode electrode. PEFC is a system which generates power through a chemical reaction between oxygen in air, which is supplied to the cathode electrode and hydrogen, which is supplied to the anode (hereinafter, this reaction is referred to as "power generation reaction").

However, since the power generation reaction is exothermic reaction, in order to maintain stable operation with keeping the interior of the fuel cell at a constant temperature, a cooling apparatus, which removes the generated heat should be required.

Usually, a system has bee utilized in which a passage, which is completely separated from the fuel gas and oxidant gas (air) by a separator, is provided on each of the fuel cells (single cells), within the fuel cell, a cooling liquid flows between the passage and a heat exchanger, to thereby cooling the fuel cell.

However, when the fuel cell is used over a prolong period of time, a sealing member, which seals around the separator, is deteriorated, having a possibility to leak the fuel gas and the oxidant gas into the cooling liquid. The fuel gas and the like leaked into the cooling liquid would cause decreasing of cooling performance or another troubles.

Japanese Patent Laid-Open No. 2001-250570 suggests a technique wherein in a heat-exchanging system, which supplies a heat-exchanging medium to the fuel cell, means for detecting the fuel gas is provided on at least one portion of the heat exchanging means and the interior of the heat-exchanging medium passage, for example, on a radiator cap residing on the top portion of a radiator (heat exchanger) or a portion at which the gases separated from the cooling liquid are collected, the gases separated from the cooling liquid are detected by the means for detecting the fuel gas to warn when the leakage of the gas such as the fuel gas into the cooling liquid is detected.

If the fuel gas or such is leaked into the cooling medium, the conventional technique can detect the leakage before the concentration of the fuel gas or such reaches a prescribed amount to warn, and if the concentration is increased thereafter, procedures such as stopping the operation of the fuel cell can be made. However, in the conventional technique, in this case, personal maintenance such as removal of the collected gas from the cooling liquid within the heat exchanger or circulation passage should be made, which reduces easy-to-use the fuel cell. Furthermore, once the concentration of the fuel gas in the cooling liquid becomes high, the cooling liquid must be exhaust as its concentration of the fuel cell is high.

In light of such situations, the present invention has been made. An object of the present invention is to provide an apparatus for cooling a fuel cell, which can dilute the fuel cell introduced into the cooling liquid to a lower concentration, making it possible to exhaust the cooling liquid with a low concentration of the fuel gas, and to enhance the operability of the power generation system through the fuel cell, by exhausting the gas, which has hitherto been left collected within the heat-exchanger and the circulation passage of cooling liquid, at any time without requiring personal maintenance whereby the concentration of the fuel gas in the cooling liquid can be maintained at a low level and the cooling performance of the apparatus for cooling the fuel cell can be prevented.

SUMMARY OF THE INVENTION

According to the first aspect of the present invention, there is provided an apparatus for cooling a fuel cell, which generates power by supplying air and a fuel gas, in which a cooling liquid is circulated between the fuel cell and a heat exchanger, said apparatus separating the gas introduced into said cooling liquid, mixing the separated gas with the air supplied to or exhausted from said fuel cell, and then exhausting the gas.

In the apparatus, the gas mixed with air supplied to the fuel cell may be introduced into a cathode of the fuel cell.

According to the second aspect of the present invention, there is provided an apparatus for cooling a fuel cell, which generates power by supplying air and a fuel gas, having a circulation passage for circulating a cooling liquid between the fuel cell and a heat exchanger, said apparatus possessing a cooling liquid storage container, which stores parts of the cooling liquid within said circulation passage, communicated with said circulation passage via gas drawing passage, and communicated with said circulation passage via a passage for returning a cooling liquid, wherein said cooling liquid storage container is communicated with a supply air pipe, which supplies air into the fuel cell, or with an exhaust pipe, which exhausts the air from the fuel cell, via a signal pressure pipe, and wherein the air incorporated into said signal pressure pipe from the supply air pipe side or from the exhaust air pipe side is pushed back towards said supply air pipe or said exhaust air pipe to be exhausted in said supply air pipe or said exhaust air pipe when the pressure of the gas separated from the cooling liquid flowing from the circulation passage through said gas drawing passage and stored in said cooling liquid storage container is higher than the pressure of the supply air within said supply air pipe or the pressure of the exhaust air within said exhaust air pipe.

In this apparatus, the pressure of the air supplied into the fuel cell through the supply air pipe or the pressure of the air exhausted from the fuel cell through the exhaust air pipe is changed whereby the gas is exhausted into said supply air pipe or said exhaust air pipe.

Also, in this cooling apparatus, the pressure within said signal pressure pipe is increased to be not less than a prescribed pressure and then returned to the stationary pressure.

Furthermore, in this cooling apparatus, the pressure of the air supplied into the fuel cell through the supply air pipe or the pressure of the air exhausted from the fuel cell through the exhaust air pipe is changed when the pressure difference between the pressure of the gas within said cooling liquid storage container and the pressure within the air within the supply air pipe or between said cooling liquid storage container and the pressure within the exhaust air pie is not changed over a prescribed period.

Still further, in this cooling apparatus, the pressure of the air supplied to the fuel cell from the supply air pipe is changed when the fuel gas concentration within said cooling liquid storage container is not less than a prescribed concentration.

Moreover, in this, the pressure of the air supplied to the fuel cell from the supply air pipe is changed when the fuel gas concentration within said cooling liquid storage container is considered to be increased.

According to the third aspect of the present invention, there is provided an apparatus for cooling a fuel cell, which generates power by supplying air and a fuel gas, having a circulation passage for circulating a cooling liquid between the fuel cell and a heat exchanger, said apparatus possessing a cooling liquid storage container, which stores parts of the cooling liquid within said circulation passage, said cooling liquid storage container possessing a liquid phase portion communicated with said circulation passage via gas drawing passage, and a gas phase portion which is communicated with a supply air pipe, which supplies air into said fuel cell via a flow-in pipe, and which mixes the gas separated from the cooling liquid within said liquid phase portion with the air flowing therein thorough said flow-in pipe from said supply air pipe.

In this apparatus, said gas phase portion possesses means for detecting a fuel gas, which detects the internal fuel cell concentration.

Also, this apparatus may possesses pressure control means, which pushes back the gas within said gas phase portion to said supply gas pipe or to an exhaust gas pipe from the fuel cell, when the fuel gas concentration within said gas phase portion is not less than a prescribed concentration.

Also, in this cooling apparatus, said pressure control means is means, which increases the pressure within said signal pressure pipe to be not less than a prescribed pressure and then returns the pressure to a stationary pressure.

According to the fourth aspect of the present invention, there is provided an apparatus for cooling a fuel cell, which generates power by supplying air and a fuel gas, having a circulation passage for circulating a cooling liquid between the fuel cell and a heat exchanger, said apparatus possessing a cooling liquid storage container, which stores parts of the cooling liquid within said circulation passage, said cooling liquid storage container possessing a liquid phase portion communicated with said circulation passage via gas drawing passage, and a gas phase portion which is communicated with a supply air pipe, which supplies air into said fuel cell via a flow-in pipe and via a flow-out pipe, and which mixes the gas separated from the cooling liquid within said liquid phase portion with the air flowing therein thorough said flow-in pipe from said supply air pipe, and returns the mixed gas into said supply air pipe via said flow-out pipe, said flow-in pipe being communicated with said supply air pipe at an upstream portion of a humidifier, which is provided on the way to said supply air pipe and which humidifies the air to be supplied to said fuel cell, and said flow-out pipe being communicated with said supply air pipe at a downstream of said humidifier.

In this apparatus, said cooling liquid storage container possesses means for detecting a fuel gas, which detects the internal fuel cell concentration.

According to the fifth aspect of the present invention, there is provided an apparatus for cooling a fuel cell, which generates power by supplying air and a fuel gas, having a circulation passage for circulating a cooling liquid between the fuel cell and a heat exchanger, said apparatus possessing a cooling liquid storage container, which stores parts of the cooling liquid within said circulation passage, communicated with said circulation passage via gas drawing passage, and communicated with said circulation passage via a passage for returning a cooling liquid, and an air pipe in which air supplied to or exhausted from said fuel cell flows, and said cooling liquid storage container possessing a gas exhaust mechanism, which is communicated with said air pipe via a ventilation pipe, and which exhausts the fuel gas stayed in said cooling liquid storage container out of the system by a ventilation current flowing within said ventilation pipe.

In this apparatus, a flow amount of said ventilation current is controlled depending upon the fuel gas concentration within said cooling liquid storage container.

Also, in this cooling apparatus, a ventilation amount within said cooling liquid storage is increased when the fuel gas concentration within said cooling liquid storage container arrives at a prescribed concentration or more.

Furthermore, in this cooling apparatus, the gas within said cooling liquid storage container is exhausted by said gas exhaust mechanism, when the pressure within said air pipe is increased whereby said fuel gas concentration within said cooling liquid storage container is decreased to a prescribed concentration.

Also, in this cooling apparatus, the pressure within said cooling liquid storage container is decreased to increase the flow amount of said ventilation current when the fuel gas concentration within said cooling liquid storage container arrives at a prescribed concentration or more.

BRIEF DESCRIPTION OF THE DRAWINGS

FIG. 9 shows change in the hydrogen concentration within the cooling liquid storage container at the time of driving a vehicle in which the fuel cell having the cooling apparatus is carried.

DESCRIPTION OF THE PREFERRED EMBODIMENTS

Figure 1:
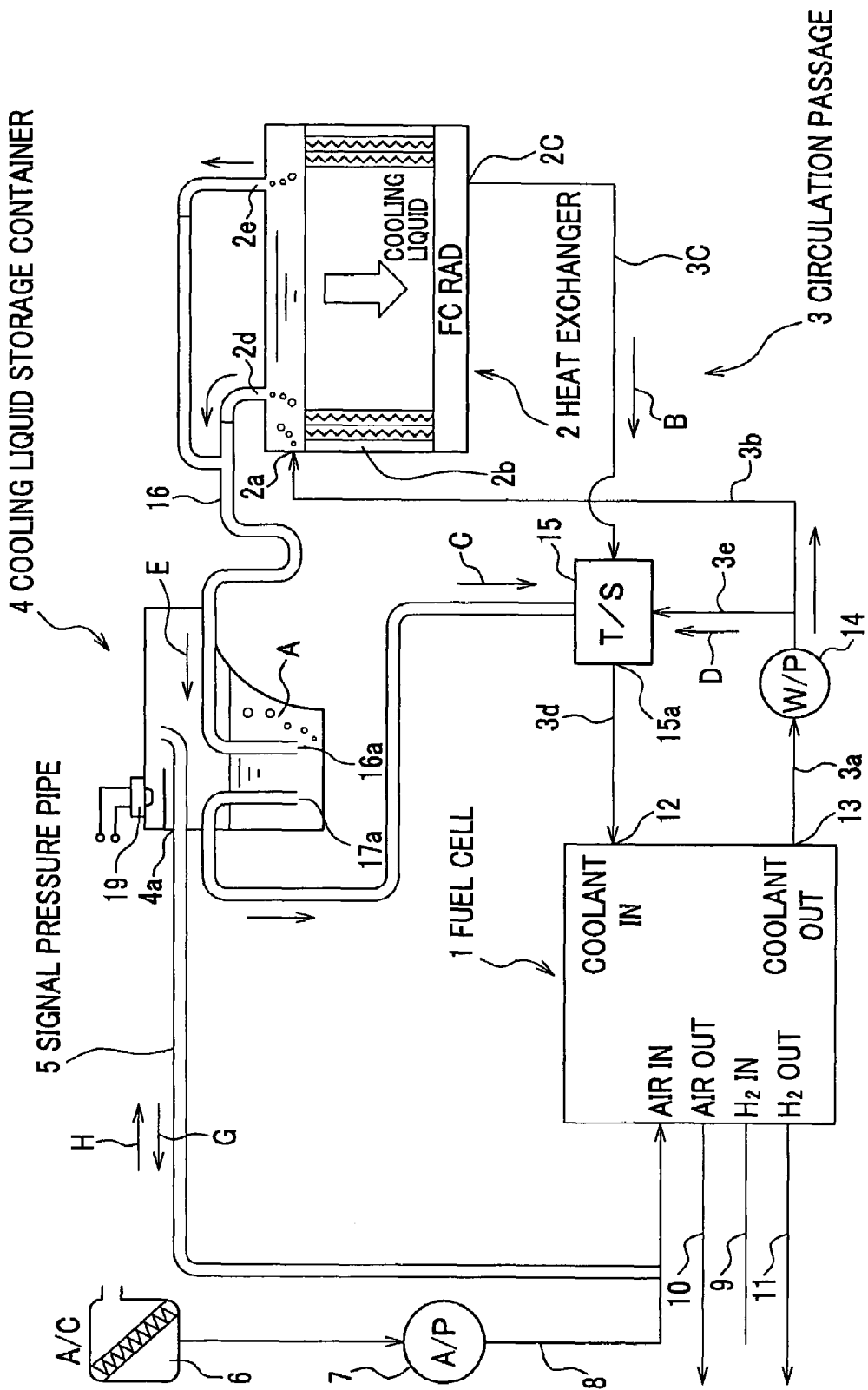
FIG. 1 is a block diagram showing the configuration of the apparatus for cooling a fuel cell according to the first embodiment.

Embodiments of the present invention will now be described by referring to the drawings.

First Embodiment

FIG. 1 is a block diagram showing the configuration of the apparatus for cooling a fuel cell according to the first embodiment.

An apparatus for cooling a fuel cell (hereinafter sometimes referred to as cooling apparatus) according to the first embodiment is carried on an fuel cell electric vehicle (not shown), and is composed of a heat exchanger 2, which cools a cooling liquid supplied to a fuel cell 1, a circulation passage 3, which circulates the cooling liquid between the fuel cell 1 and the heat exchanger 2, a cooling liquid container 4, which stores a part of the cooling liquid within the circulation passage 3, and a signal pressure pipe 5.

The fuel cell 1 is composed, for example, of a plurality units of fuel cell (single cell) composed of a polymer membrane electrode comprising a polymer ion-exchange membrane intervened between an anode and a cathode. When hydrogen gas is supplied to the anode as a fuel gas, and when air is supplied to a cathode as an oxidant gas, hydrogen ions generated at the anode are passed through the polymer membrane electrode to be migrated to the cathode. At the cathode, an electrochemical reaction between the migrated hydrogen ions and oxygen occurs by a catalyst in the cathode to produce water. Since this reaction is exothermic, in order to secure the reaction efficiency, the temperature of the fuel cell 1 is kept at approximately 70° C. by circulating cooling water on a surface of a separator opposing the anode or cathode side. The generated power is supplied to a driving motor (not shown) of an fuel cell electric vehicle to drive the vehicle.

The fuel cell 1 is an apparatus for generating power by a power generation reaction between an air, which is purified through an air cleaner 6 and which is supplied through an supply air pipe 8 by an air pump 7, and the fuel gas, which is supplied through a fuel gas supply pipe 9. After the power generation reaction, an air remaining unconsumed by the power generation reaction is exhausted from the fuel cell 1 through an exhaust pipe 10, and a fuel gas remaining unconsumed by the power generation reaction is exhausted from the fuel cell 1 through an exhaust pipe 11 for a fuel gas. The fuel cell 1 also possesses an cooling liquid inlet 12 and a cooling liquid outlet 13. As the fuel gas, hydrogen, hydrocarbons, reformed gas in which hydrocarbon is reformed, methanol and the like can be mentioned.

The heat exchanger 2 possesses an inlet 2a, into which the cooling liquid returned from the fuel cell 1 by the circulation passage 3 flows, a body of the heat exchanger 2b, which cools down the cooling liquid by heat exchange between the cooling liquid and a secondary medium, such as wind generated by driving a vehicle; and an outlet 2c from which the cooling liquid having been cooled due to the heat exchange flows. The heat exchanger 2 may be a liquid cooling system in which water or other medium is used as the secondary cooling medium or an air cooling system in which air is used as the secondary cooling medium.

The heat exchanger 2 also possesses outlets 2d and 2e for cooling liquid/gas, which flows parts of the cooling liquid flowing in from the inlet 2a through the circulation passage 3 flow in a storage container for a cooling liquid.

The circulation passage 3 is a passage for circulating the cooling liquid between the fuel cell 1 and the heat exchanger 2 in a heat-exchangeable manner, and is composed of a flow-out passage 3a, a flowing passage 3b, a returning passage 3c, a flow-in passage 3d, and a regulated flow passage 3e.

The flow-out passage 3a is a passage which communicates an outlet 13 of the fuel cell 1 with a pump 14 for a cooling liquid, and in which the cooling liquid flowing out from the fuel cell flows.

The flowing passage 3b is a passage which communicates the pump 14 for a cooling liquid with the inlet 2a of the heat-exchanger 2, and in which the cooling liquid flowing through the flow-out passage 3b and being compressed by the pump 14 for a cooling liquid flows.

The returning passage 3c is a passage which communicates the outlet 2c of the heat exchanger 2 with a thermostat 15, and in which the cooling liquid flowing out from the inlet 2c flows to the thermostat.

The flow-in passage 3d is a passage which communicates the thermostat 15 with the inlet 12 of the fuel cell 1, and in which the cooling liquid flowing out from the thermostat 15 flows in the inlet 12 of the fuel cell 1.

The regulated flow passage 3e is a passage which communicates the flowing passage 3b with the thermostat, and in which parts of the cooling liquid flowing through the flowing passage 3b is joined with the cooling liquid flowing from the returning passage 3c into thermostat 15 so that the temperature of the cooling liquid supplied from the inlet 12 into the fuel cell 1 via the flowing passage 3d may be within a prescribed range.

The thermostat 15 is a device, which has a function that depending upon temperatures of cooling liquid B, flowing in from the heat exchanger 2 via the returning passage 3c, cooling liquid C, flowing in from the cooling liquid container 4 via the returning passage 3d, and cooling liquid D, flowing via the regulated flow passage 3e, opens or closes the flowing routes of the respective passages, mixes cooling liquids B, C, and D, keeps the temperature of the cooling liquid flowing out of the outlet 15e, passing through the flowing passage 3d, and being supplied to the fuel cell 1 from the inlet 12, at a prescribed temperature.

The cooling liquid container 4 has functions that parts of the cooling liquid within the circulation passage 3 flowing from the heat exchanger 2 is stayed in a lower portion thereof for storage and that the gas separated from the cooling liquid is stained in an upper portion thereof to play a role in a gas/liquid separator.

As shown in FIG. 1, an edge portion 16a of a passage 16 for drawing a gas in a cooling liquid and an edge portion 17a of a passage 17 for returning a cooling liquid are inserted into the cooling liquid container 4. Also, to the cooling liquid container 4, the supply air pipe 8 is communicated via the signal pressure pipe 5 communicated with a gas inlet/outlet 4a provided on an upper portion of the cooling liquid container 4.

In this cooling liquid container 4, the edge portion 16a of the passage 16 for drawing a gas in a cooling liquid is placed on a portion lower than the liquid surface of cooling liquid A, which is stayed in a lower portion of the cooling liquid container 4 so that the gas contained in the cooling liquid flowing in the heat exchanger 4 is separated from the liquid, is floated on an upper space, and is stayed.

The edge portion 17a of the passage 17 for returning a cooling liquid is also placed on a portion lower than the liquid surface of cooling liquid A so that the cooling liquid flowing within the circulation passage 3 is communicated with the cooling liquid within the cooling liquid container 4.

Since the cooling liquid container 4 is connected to the signal pressure pipe 5, the pressure of the supply air supplied by the signal pressure pipe 5 loads to the cooling liquid flowing in flow-in passage 3d of the circulation passage 3. The pressure of the cooling liquid within the gas phase of the cooling liquid container 4 is substantially the same as the pressure of the supply air. Although the pressure loss occurs by the flowing of the cooling liquid within the circulation passage 3, the pressure loss is substantially constant independent of the pressure of the cooling liquid within the circulation passage 3, and, thus, the pressure difference between the pressure of the cooling liquid supplied to the fuel cell 1 and the pressure of the air supplied to the fuel cell 1 is set so that the pressure of the cooling liquid is lower than that of the air as the pressure loss. By such a configuration, the pressure difference between the passage for cooling liquid and the passage for supply air within the fuel cell 1 composed of a laminated construction is kept at a prescribed range.

The signal pressure pipe 5 communicates the supply air pipe 8 and the cooling liquid storage 4. By the signal pressure pipe 5 and the cooling liquid storage 4 communicated therewith, the cooling liquid storage container 4 breathes depending upon the pressure difference between pressure PG of the gas staying at the upper portion of the cooling liquid storage container 4 and the pressure of the air supplied to the fuel cell 1 through the supply air pipe 8 (pressure of supply air). The term "breathing" to be intended herein means that depending upon the pressure difference described above, one of the gas within the cooling liquid storage container 4 and the air within the supply air pipe 8 is pushed forward or back or moved toward any direction.

Next, a process for cooling a fuel cell in the apparatus for cooling a fuel cell according to the first embodiment will be described. Also, the exhaust of the gas contained in the cooling liquid will be described.

In the apparatus for cooling a fuel cell, the air, which is purified by the air cleaner 6, and then supplied within the fuel cell 1 through the air pump, and the fuel gas supplied within the fuel cell 1 through fuel gas supply pipe 9 are brought about the power generation reaction to generate power. After the power generation reaction, an air remaining unconsumed by the power generation reaction is exhausted from the fuel cell 1 through an exhaust pipe 10, and a fuel gas remaining unconsumed by the power generation reaction is exhausted from the fuel cell 1 through an exhaust pipe 11.

The heat generated during the course of the power generation reaction is supplied within the fuel cell 1 from the inlet 12, and is absorbed by the cooling liquid flowing through the passage provided within the fuel cell 1 so as to keep the temperature of the fuel cell 1 at a prescribed temperature.

The cooling liquid having absorbed the heat flows from the outlet 13 out of the fuel cell 1, and flows through the flow out passage 3a of the circulation passage 3, the pump 14 for a cooling liquid, and the flowing passage 3b, on this order, is compressed by the pump 14 for a cooling liquid, and flows in the heat exchanger 2 at which the cooling liquid is allowed to cool down by heat-exchange with the secondary cooling medium at the body 2b of the heat exchanger. After the heat exchange, the cooling liquid flows out from the outlet 2c of the heat exchanger 2, flows within the returning passage 3c, and flows in the thermostat 15.

At the thermostat 15, depending upon temperatures of cooling liquid B, flowing in from the heat exchanger 2 via the returning passage 3c, cooling liquid C, flowing in from the cooling liquid container 4 via the returning passage 3d, and cooling liquid D, flowing via the regulated flow passage 3e, flowing routes of the respective passages are opened or closed, to thereby mix cooling liquids B, C, and D, whereby the cooling liquid whose temperature is regulated to a prescribed temperature flows out from the outlet 15a, through the flow-in passage 3d to be supplied into the fuel cell 1. The interior of the fuel cell 1 is cooled by the cooling liquid thus supplied.

As described above, the cooling apparatus according to the first embodiment of the present invention can keep the temperature within the fuel cell 1 at a prescribed temperature by circulating the cooling liquid between the fuel cell 1 and the heat exchanger 2 via the circulation passage 3, making it possible to stably operate the fuel cell.

Parts E of the cooling liquid flowing into the heat exchanger from the inlet 2a flows in the cooling liquid storage container 4 via the passage 16 for drawing a gas in a cooling liquid. At this time, the gas contained in the cooling liquid is separated, floats from the liquid surface of the cooling liquid A to stay at the upper space (gas phase portion). At this time, the cooling liquid stays in the lower portion of the cooling liquid storage container 4. Cooling liquid A staying in the lower portion of the cooling liquid storage container 4 is communicated with the cooling liquid flowing through the flow-in passage 3 of the circulation passage 3. Since the cooling liquid container 4 is connected to the signal pressure pipe 5, the pressure of the supply air supplied by the signal pressure pipe 5 loads to the cooling liquid flowing in flow-in passage 3d of the circulation passage 3. The pressure of the cooling liquid within the gas phase of the cooling liquid container 4 is substantially the same as the pressure of the supply air. Although the pressure loss occurs by the flowing of the cooling liquid within the circulation passage 3, the pressure loss is substantially constant independent of the pressure of the cooling liquid within the circulation passage 3, and, thus, the pressure difference between the pressure of the cooling liquid supplied to the fuel cell 1 and the pressure of the air supplied to the fuel cell 1 is set so that the pressure of the cooling liquid is lower than that of the air as the pressure loss. By such a configuration, the pressure difference between the passage for cooling liquid and the passage for supply air within the fuel cell 1 composed of a laminated construction is kept at a prescribed range.

The signal pressure pipe 5 communicates the supply air pipe 8 and the cooling liquid storage 4. By the signal pressure pipe 5 and the cooling liquid storage 4 communicated therewith, the cooling liquid storage container 4 breathes depending upon the pressure difference between pressure PG of the gas staying at the upper portion of the cooling liquid storage container 4 and the pressure of the air supplied to the fuel cell 1 through the supply air pipe 8 (pressure of supply air). The term "breathing" to be intended herein means that depending upon the pressure difference described above, one of the gas within the cooling liquid storage container 4 or the air within the supply air pipe 8 is pushed forward or back or moved toward any direction. If the pressure of the gas PG is higher than the pressure of the air PA, the gas within the cooling liquid storage container 4 flows through the signal pressure pipe 5 from the cooling liquid container 4 towards the supply air pipe 8 (to the direction shown by Arrow G in FIG. 1), to push back the air, which is incorporated into the signal pressure pipe 5 from the side of the supply air pipe 8, toward the side of the supply air pipe 8, whereby the gas contained in the cooling liquid within the cooling liquid storage container 4 is exhausted into the supply air pipe 8. If the pressure PG of the gas is lower than the pressure PA of the air, the gas within the cooling liquid storage container 4 is pushed back from the supply air pipe 8 to the cooling liquid storage container 4 (as shown in Arrow H), and the air flows in the cooling liquid storage container 4, diluting the gas in the cooling liquid storage container 4. Also, the gas exhausted into the supply air pipe 8 (for example, the fuel gas) is mixed with the air to be supplied to the fuel cell 1, and then combusted in the cathode of the fuel cell, after which it is exhausted.

Furthermore, by breathing of the cooling liquid storage container 4, the pressure at the gas phase portion of the cooling liquid storage container 4 becomes substantially the same (PA=PG). The pressure of the cooling liquid within the cooling liquid storage tank 4 becomes substantially the same as that of the gas phase portion, and thereafter the pressure loss occurs before the cooling liquid is supplied to the fuel cell 1 due to passing it through the circulation passage 3. However, the pressure loss is substantially constant independent of the pressure of the cooling liquid within the circulation passage 3, and, thus, the pressure difference between the pressure of the cooling liquid supplied to the fuel cell 1 and the pressure of the air supplied to the fuel cell 1 is set so that the pressure of the cooling liquid is lower than that of the air as the pressure loss (PA>PL). Specifically, when the pressure (PA) of the supply air is increased or decreased due to change in output of the fuel cell 1 or such, the pressure changed accompanying therewith is transmitted to the cooling liquid within the liquid storage container 4, whereby the relation of PA>PL can be maintained, maintaining the pressure balance between the cooling liquid and the supply air within the fuel cell 1.

In the first embodiment, it is also possible to control the pressure difference PD to allow the cooling liquid storage container 4 for breathing. As a method for controlling the pressure difference PD, for example, a method in which the pressure of the air flowing through the supply air pipe 8 is changed by changing a rotation member of the air pump 7 or by changing an opening degree of an exhaust control valve (not shown) provided on the exhaust pipe. At this time, when PG>PA, the gas in the gas phase portion formed within the cooling liquid storage container 4 pushes back the air introduced from the side of the supply air pipe 8 into the signal pressure pipe via the signal pressure pipe 5, and then the gas is exhausted into the supply air pipe 8.

Furthermore, the cooling liquid storage container 4 may be configured to breath when the pressure difference PD is not changed over a period of a prescribed time. For example, the pressure difference PD is measured, the pressure of the air to be supplied into the fuel cell 1 is changed by the air pump 7 at the time when PD is not changed, and when PG>PA, the gas in the gas phase portion of the cooling liquid container 4 may push back the air introduced from the side of the supply air pipe 8 into the signal pressure pipe so that the gas may be exhausted into the supply air pipe 8.

Moreover, the pressure of the air supplied from the supply air pipe into the fuel cell may be changed, when the concentration of the fuel gas within the cooling liquid storage container 4 is equal to or higher than a prescribed concentration. For example, a fuel gas sensor 19 is provided on the cooling liquid storage container 4, and when the concentration of the fuel gas measured by this fuel gas sensor 19 is equal to or higher than a prescribed concentration, the pressure of the air to be supplied from the supply air pipe 8 into the fuel cell 1 is changed by the air pump 7, and when PG>PA, the gas in the gas phase portion of the cooling liquid container 4 may push back the air introduced from the side of the supply air pipe 8 into the signal pressure pipe so that the gas may be exhausted into the supply air pipe 8.

Also, when the concentration of the fuel gas within the cooling liquid storage container 4 is considered to be increased, the pressure of the air within the cooling liquid storage tank 4 is changed, and when PG>PA, the gas in the gas phase portion of the cooling liquid container 4 may push back the air introduced from the side of the supply air pipe 8 into the signal pressure pipe so that the gas may be exhausted into the supply air pipe 8. By such a configuration, the ventilation of the gas phase portion within the cooling liquid storage tank 4 can be performed in much more forcible manner. For example, program is previously inputted that the air pump 7 is actuated when the concentration of the fuel gas within the cooling liquid storage container 4 is considered to be increased, the pressure of the air supplied from the supply air pipe 8 into the fuel cell 1 by the actuation of the air pump 8 is changed so that the gas in the gas phase portion of the cooling liquid storage container 4 may be exhausted in the supply air pipe 8.

Second Embodiment

Next, an apparatus for cooling a fuel cell according to the second embodiment of the present invention shown in FIG. 2 will be described.

Figure 2:
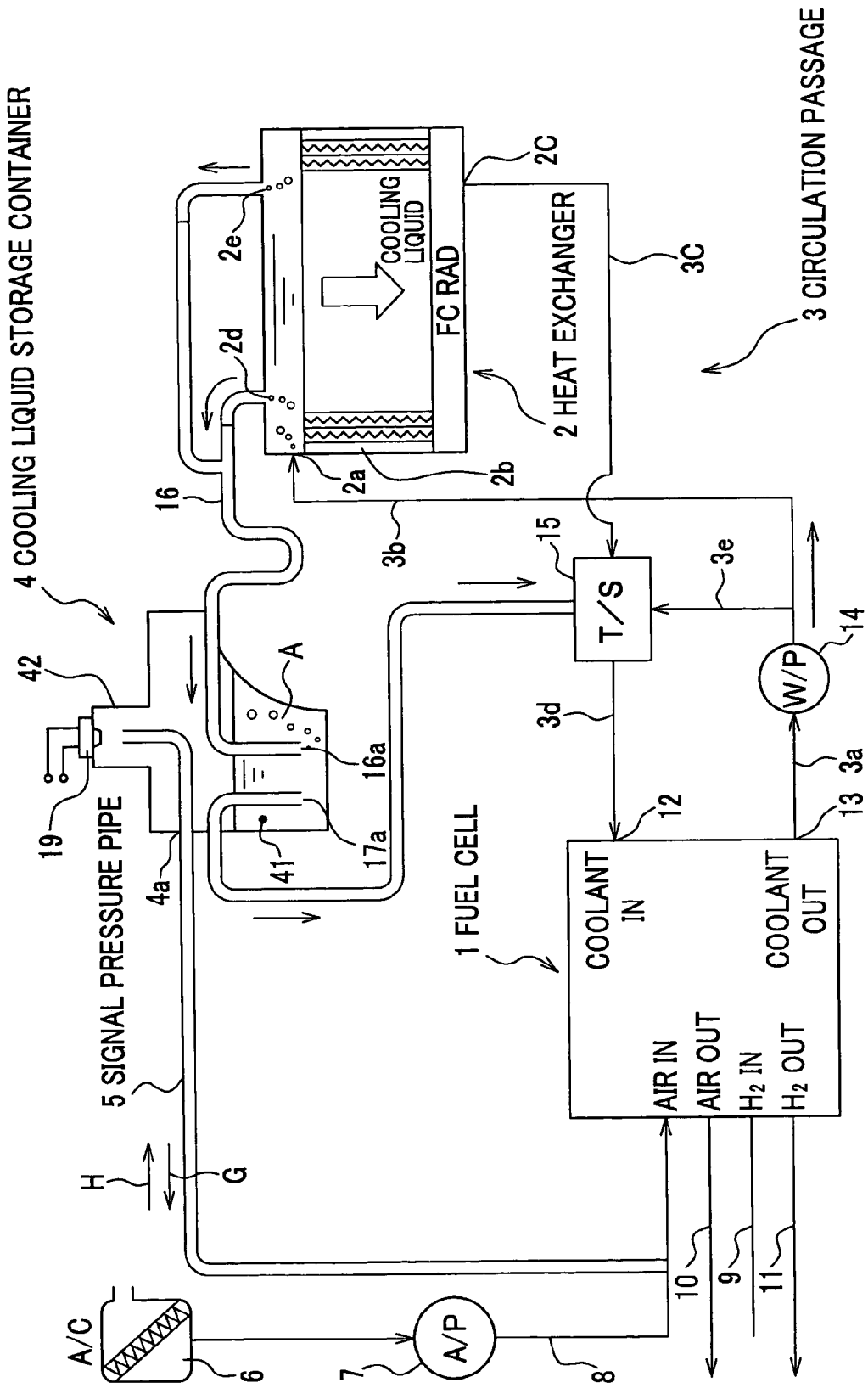
FIG. 2 is a block diagram showing the configuration of the apparatus for cooling a fuel cell according to the second embodiment.

FIG. 2 is a block diagram showing the configuration of the apparatus for cooling a fuel cell according to the second embodiment.

The apparatus for cooling a fuel cell according to the second embodiment of the present invention shown in FIG. 2 has the same configuration in terms of possessing the circulation passage 3 (3a, 3b, 3c, 3d, and 3e), which circulates the cooling liquid between the fuel cell 1 and the heat exchanger 2, the passage 16 for drawing a gas in a cooling liquid, which supplies parts of the cooling liquid from the heat exchanger 2 to the cooling liquid storage container 4, the thermostat 15, which keeps the temperature of the cooling liquid flowing within the circulation passage 3, the passage 17 for returning a cooling liquid, which returns the cooling liquid from the cooling liquid storage container 4 to the circulation passage 3, and the like. Consequently, configurations different from those of the first embodiment will be focused to describe the apparatus for cooling a fuel cell according to the second embodiment. The same numbers or symbols are assigned to the parts having the configuration same as those of the first embodiments, and the description of such parts will be omitted.

As shown in FIG. 2, in the apparatus for cooling a fuel cell according to the second embodiment, the cooling liquid storage container 4 is composed of a liquid phase portion 41 and a gas phase portion 42. In the cooling liquid storage container 4, the liquid phase portion 41 is connected to the heat exchanger 2 via the passage 16 for drawing a gas in a cooling liquid. The edge portion 16a of the passage 16 for drawing a gas in a cooling liquid is placed on a portion lower than the liquid surface of cooling liquid A, which is stayed in a lower portion of the cooling liquid container 4 so that the gas contained in the cooling liquid flowing in the heat exchanger 2 is separated from the liquid, is floated on an upper space, and is stayed.

The liquid phase portion 41 is connected to the circulation passage 3 via the passage 17 for returning a cooling liquid. The edge portion of the passage 17 for returning a cooling liquid is placed on a portion lower than the liquid surface of cooling liquid A so that the cooling liquid flowing within the circulation passage 3 and the cooling liquid within the cooling liquid storage container 4 may be communicated.

The gas phase portion 42 of the cooling liquid storage container 4 is placed on an upper portion of the liquid phase portion 41 projecting upwardly, and is communicated with the liquid phase portion 41. The gas phase portion 42 has a function that, depending upon the state of the gas, which is separated from the cooling liquid in the liquid phase portion 41, and then is floating to an upper space, the gas is mixed with the air by introducing the air from the supply air pipe 8 or by pushing back the air through the signal pressure pipe 5, whereby the gas is exhausted into the supply air pipe 8. By providing the gas phase portion 42 on the cooling liquid storage container 4, the second embodiment is effective for preventing the cooling liquid stayed in the cooling liquid storage container 4 from being leaked within the supply air pipe via the signal pressure pipe due to the vibration or tilting of the cooling liquid storage container 4. For example, at the time of driving the fuel cell carried vehicle, even if the cooling liquid storage container is vibrated or tilted, the cooling liquid can be prevented from being leaked into the supply air pipe, which is effective for continuous power generation by the fuel cell in a stable manner.

In the cooling apparatus according to the second embodiment, similar to the first embodiment, the temperature of cooling water circulated between the fuel cell 1 and the heat exchanger 2 via the circulation passage 3 is kept at constant by the thermostat 15.

At this time, depending upon the pressure difference between the gas separated from the cooling liquid and being in an upper portion of the liquid phase portion 41 and the gas drawing chamber 43 and the air flowing in he supply air pipe 8 the cooling liquid storage container 4 breathes Specifically, depending upon the pressure difference between pressure PG of the gas staying at the upper portion of the cooling liquid storage container 4 (upper portion of the liquid phase portion 41 and the gas drawing chamber 43) and the pressure PA of the air supplied to the fuel cell 1 through the supply air pipe 8 (pressure of supply air), one of the gas within the cooling liquid storage container 4 and the air within the supply air pipe 8 is moved toward any of directions towards the cooling liquid storage container 4 and towards the supply air pipe 8. If the pressure of the gas PG is higher than the pressure of the air PA, the gas within the cooling liquid storage container 4 flows through the signal pressure pipe 5 from the cooling liquid container 4 towards the supply air pipe 8 (to the direction shown by Arrow G in FIG. 2), to push back the air, which is incorporated into the signal pressure pipe 5 from the side of the supply air pipe 8, toward the side of the supply air pipe 8, whereby the gas contained in the cooling liquid within the cooling liquid storage container 4 is exhausted into the supply air pipe 8. If the pressure PG of the gas is lower than the pressure PA of the air, the cooling liquid within the cooling liquid storage container 4 is pushed back from the supply air pipe 8 to the cooling liquid storage container 4 (as shown in Arrow H, which is the direction reverse to Arrow G), and the air flows in the cooling liquid storage container 4, to be mixed with the gas within the liquid phase portion 42. Also, the gas exhausted into the supply air pipe 8 (for example, the fuel gas) is mixed with the air to be supplied to the fuel cell 1, and then combusted in the cathode of the fuel cell, after which it is exhausted.

Furthermore, by breathing of the cooling liquid storage container 4, the pressure at the gas phase portion of the cooling liquid storage container 4 becomes substantially the same (PA=PG). The pressure of the cooling liquid within the cooling liquid storage tank 4 becomes substantially the same as that of the gas phase portion 42, and thereafter the pressure loss occurs before the cooling liquid is supplied to the fuel cell 1 due to passing it through the circulation passage 3. However, the pressure loss is substantially constant independent of the pressure of the cooling liquid within the circulation passage 3, and, thus, the pressure difference between the pressure of the cooling liquid supplied to the fuel cell 1 and the pressure of the air supplied to the fuel cell 1 is set so that the pressure of the cooling liquid is lower than that of the air as the pressure loss (PA>PL). Specifically, when the pressure (PA) of the supply air is increased or decreased due to change in output of the fuel cell 1 or such, the pressure changed accompanying therewith is transmitted to the cooling liquid within the liquid storage container 4, whereby the relation of PA>PL can be maintained, maintaining the pressure balance between the cooling liquid and the supply air within the fuel cell 1.

In the second embodiment, the gas phase portion 42 may be configured to possesses means for detecting the concentration of the fuel cell. By such a configuration, when the concentration of the fuel gas within the gas phase portion 42 reaches a prescribed concentration or more, the pressure of the air supplied from the supply air pipe 8 into the fuel cell 1 For example, when the fuel gas sensor 19 is provided on the gas phase portion 42, and when the concentration of the fuel gas within the gas phase portion 42 measured by the fuel gas sensor 19 reaches a prescribed concentration or more, the pressure of the air supplied from the supply air pipe 8 into the fuel cell 1 is changed by the air pump 7. Furthermore when PG>PA, the gas in the gas phase portion of the cooling liquid container 4 may push back the air introduced from the side of the supply air pipe 8 into the signal pressure pipe so that the gas may be exhausted into the supply air pipe 8.

Also, it may be configured to provide means for controlling a pressure, which pushes back the gas within the gas phase portion 42 from the supply air pipe 8 or the fuel cell into the exhaust pipe 10 by controlling the pressure within the signal pressure pipe 5 when the concentration of the fuel gas within the gas phase portion 42. For example, the means for controlling a pressure may be means, which increases the pressure within the signal pressure pipe to a prescribed pressure or more, and which then returns the pressure to the stationary state. By increasing the pressure within the signal pressure pipe 5 to a prescribed pressure or more, specifically, increasing the pressure difference PD to a prescribed level or more, and then by returning the pressure to the stationary state to allow the cooling liquid storage container 4 for breathing, and when PG>PA, the gas in the gas phase portion of the cooling liquid container 4 may push back the air introduced from the side of the supply air pipe 8 into the signal pressure pipe so that the gas may be exhausted into the supply air pipe 8.

Third Embodiment

Next, an apparatus for cooling a fuel cell according to the third embodiment of the present invention shown in FIG. 3 will be described.

Figure 3:
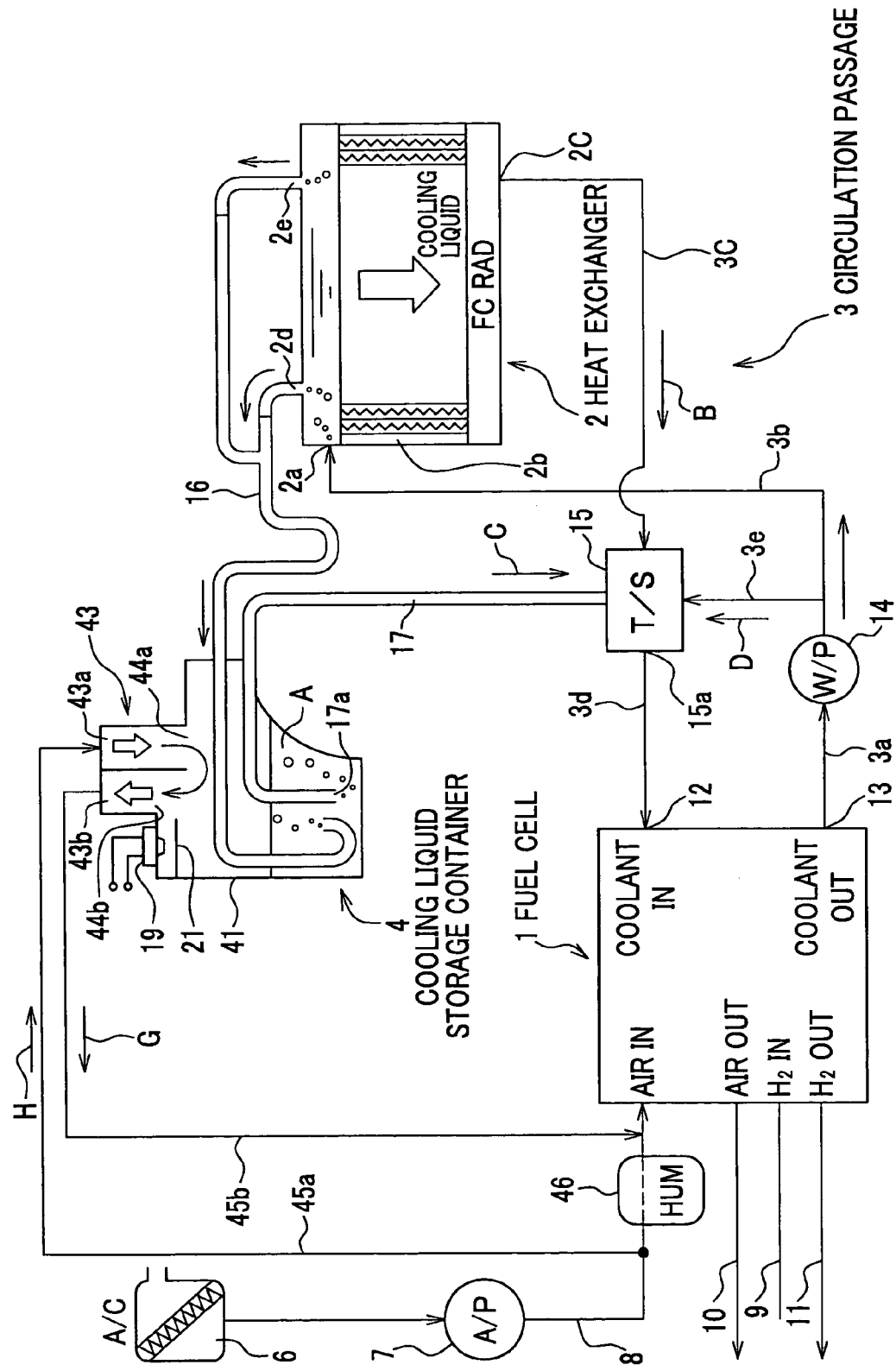
FIG. 3 is a block diagram showing the configuration of the apparatus for cooling a fuel cell according to the third embodiment.

FIG. 3 is a block diagram showing the configuration of the apparatus for cooling a fuel cell according to the third embodiment.

The apparatus for cooling a fuel cell according to the third embodiment of the present invention shown in FIG. 2 has the same configuration in terms of possessing the circulation passage 3 (3a, 3b, 3c, 3d, and 3e), which circulates the cooling liquid between the fuel cell 1 and the heat exchanger 2, the passage 16 for drawing a gas in a cooling liquid, which supplies parts of the cooling liquid from the heat exchanger 2 to the cooling liquid storage container 4, the thermostat 15, which keeps the temperature of the cooling liquid flowing within the circulation passage 3, the passage 17 for returning a cooling liquid, which returns the cooling liquid from the cooling liquid storage container 4 to the circulation passage 3, and the like. Consequently, configurations different from those of the first embodiment will be focused to describe the apparatus for cooling a fuel cell according to the third embodiment. The same numbers or symbols are assigned to the parts having the configuration same as those of the first embodiments, and the description of such parts will be omitted.

As shown in FIG. 3, in the apparatus for cooling a fuel cell according to the third embodiment, the cooling liquid storage container 4 is composed of a liquid phase portion 41 and a gas drawing chamber 43. In the cooling liquid storage container 4, the liquid phase portion 41 is connected to the heat exchanger 2 via the passage 16 for drawing a gas in a cooling liquid. The edge portion 16*a* of the passage 16 for drawing a gas in a cooling liquid is placed on a portion lower than the liquid surface of cooling liquid A, which is stayed in a lower portion of the cooling liquid container 4 so that the gas contained in the cooling liquid flowing in the heat exchanger 4 is separated from the liquid, is floated on an upper space, and is stayed.

The liquid phase portion 41 is connected to the circulation passage 3 via the passage 17 for returning a cooling liquid. The edge portion of the passage 17 for returning a cooling liquid is placed on a portion lower than the liquid surface of cooling liquid A so that the cooling liquid flowing within the circulation passage 3 and the cooling liquid within the cooling liquid storage container 4 may be communicated.

The gas drawing chamber 43 of the cooling liquid storage container 4 is placed on an upper portion of the liquid phase portion 41 projecting upwardly, and is sectioned into a flow-in chamber 43*a* and a flow-out chamber 43*b*. The flow-in chamber 43*a* and the flow-out chamber 43*b* are with the liquid phase portion 41 via openings 44*a* and 44*b*, respectively. The flow-in chamber 43*a* is communicated with the supply air pipe 8 via an air flow-in pipe 45*a*, and the flow-out chamber 43*b* is communicated with the supply air pipe 8 via a gas flow-in pipe 45*b*. At an upstream of a humidifier 46 provided on the way to the supply air pipe, the air flow-in pipe 45*a* is connected, and at a downstream of the humidifier 46, the gas flow-out pipe 45*b* is connected. The humidifier 46 humidifies the air supplied to the fuel cell.

The gas drawing chamber 43 has a function that, depending upon the state of the gas, which is separated from the cooling liquid in the liquid phase portion 41, and then is floating to an upper space, the gas is mixed with the air by introducing the air from the air flow-in pipe into the flow-in chamber 43 or the gas in the gas phase portion is exhausted from the flow-out chamber 43*b* into the supply air pipe 8 via the gas flow-out pipe 45*b*.

In the cooling apparatus according to the third embodiment, similar to the first embodiment, the temperature of cooling water circulated between the fuel cell 1 and the heat exchanger 2 via the circulation passage 3 is kept at constant by the thermostat 15.

At this time, by communicating the gas phase portion 42 of the cooling liquid storage container 4 with the supply air pipe 8 via the signal pressure pipe 5, the cooling liquid storage container 4 breathes depending upon the pressure difference between pressure PG of the gas staying at the upper portion of the liquid phase portion 41 and at the gas phase portion 42 and the pressure of the air supplied to the fuel cell 1 through the supply air pipe 8. Specifically, depending upon the pressure difference between pressure PG of the gas staying at the upper portion of the cooling liquid storage container 4 (upper portion of the liquid phase portion 41 and the gas phase portion 42) and the pressure of the air supplied to the fuel cell 1 through the supply air pipe 8 (pressure of supply air), one of the gas within the cooling liquid storage container 4 and the air within the supply air pipe 8 is moved toward any of directions towards the cooling liquid storage container 4 and towards the supply air pipe 8 with the air flow-in pipe 45*a* or the gas flow-out pipe 45*b*. At this time, at an upstream of a humidifier 46 provided on the way to the supply air pipe, the air flow-in pipe 45*a* is connected, and at a downstream of the humidifier 46, the gas flow-out pipe 45*b* is connected. For this reason, a vitalization amount within the cooling liquid storage container 4 is increased due to the pressure loss generated by the humidifier 46. If the pressure of the gas PG is higher than the pressure of the air PA, the gas within the cooling liquid storage container 4 flows through the gas flow-out pipe 45*b* from the flow-out chamber 43*b* of the cooling liquid container 4 towards the supply air pipe 8 (to the direction shown by Arrow G in FIG. 3), to push back the air, which is incorporated into the gas flow-out pipe 45*b* pressure pipe 5 from the side of the supply air pipe 8, toward the side of the supply air pipe 8, whereby the gas contained in the cooling liquid within the cooling liquid storage container 4 is exhausted into the supply air pipe 8. If the pressure PG of the gas is lower than the pressure PA of the air, the cooling liquid within the flow-in chamber 43 the cooling liquid storage container 4 is pushed back from the supply air pipe 8 to the cooling liquid storage container 4 (as shown in Arrow H, which is the direction reverse to Arrow G), and the air flows in. At this time, if the gas within the cooling liquid storage container 4 flows out from the flow-out chamber 43 towards the supply air pipe 8 (the direction shown in Arrow G in the figure) due to the pressure loss, and if the gas within the flow-in chamber 42*a* of the cooling liquid storage container 4 is pushed back from the supply air pipe 8 towards the cooling liquid storage container 4 (the direction shown as Arrow H) whereby the air flows in, flowing-out of the gas and the flowing-in of the air are increased. For this reason, ventilation of the gas phase portion within the cooling liquid storage container 4 is much more accelerated.

Furthermore, by breathing of the cooling liquid storage container 4, the pressure at the gas phase portion of the cooling liquid storage container 4 becomes substantially the same (PA=PG). The pressure of the cooling liquid within the cooling liquid storage tank 4 becomes substantially the same as that of the gas phase portion 42, and thereafter the pressure loss occurs before the cooling liquid is supplied to the fuel cell 1 due to passing it through the circulation passage 3. However, the pressure loss is substantially constant independent of the pressure of the cooling liquid within the circulation passage 3, and, thus, the pressure difference between the pressure of the cooling liquid supplied to the fuel cell 1 and the pressure of the air supplied to the fuel cell 1 is set so that the pressure of the cooling liquid is lower than that of the air as the pressure loss (PA>PL). Specifically, when the pressure (PA) of the supply air is increased or decreased due to change in output of the fuel cell 1 or such, the pressure changed accompanying therewith is transmitted to the cooling liquid within the liquid storage container 4, whereby the relation of PA>PL can be maintained, maintaining the pressure balance between the cooling liquid and the supply air within the fuel cell 1.

In the third embodiment, the cooling liquid storage container 4 may be configured to possesses means for detecting the concentration of the fuel cell. By such a configuration, when the concentration of the fuel gas within the cooling liquid storage container 4 reaches a prescribed concentration or more, the ventilation within the cooling liquid storage container 4 may be forcibly performed in such a manner that the pressure of the air supplied from the supply air pipe 8 into the fuel cell 1 by the air pump 7 is be changed. For example, as shown in FIG. 3, a fuel gas sensor 19 may be provided on an upper portion of the liquid phase portion 41 of the cooling liquid storage container 4. In this case, the fuel gas sensor 19 may be protected not so as to be in contact with the cooling liquid A due to vibration or tilting by a shielding plate provided on a lower portion. When the concentration of the fuel gas measured by the fuel gas sensor 19 reaches a prescribed concentration or more, the pressure of the air supplied from the supply air pipe 8 into the fuel cell 1 by the air pump 7 is forcibly changed, and when PG>PA, the gas in the gas phase portion of the cooling liquid container 4 may push back the air introduced from the side of the supply air pipe 8 through the gas flow-out pipe 45$b$ into the signal pressure pipe so that the gas may be exhausted into the supply air pipe 8.

It is noted that in the first and the second embodiments, while the cooling liquid storage container 4 (the gas phase portion 41) has a configuration so as to be communicated with the supply air pipe 8 via the signal pressure pipe 5, the apparatus for cooling a fuel cell according to the present invention may have a configuration in which the cooling liquid storage container 4 (the gas phase portion 41) is communicated with the exhaust pipe 10.

In this configuration, similar to the first and the second embodiments, the temperature of the cooling liquid circulated between the fuel cell 1 and the heat exchanger 2 via the circulation passage 3 may be kept at constant by the thermostat 15. Also, the cooling liquid flowing within the circulation passage 3 loads a pressure by the cooling liquid storage container 4 (the liquid phase portion 41) provided on a portion upper than the fuel cell 1, whereby the pressure of the cooling liquid circulated within the circulation passage 3 may be kept at constant.

At this time, since the cooling liquid storage container 4 (the gas phase portion 42) is communicated with the exhaust pipe 10 in which the exhaust air flows via the signal pressure pipe (see FIG. 1). depending upon the pressure difference PE between the gas separated from the cooling liquid and being in an upper portion of the cooling liquid storage container 4 (upper portion of the liquid phase portion 41 and the gas phase portion 42), and the gas flowing within the exhaust pipe 10, the cooling liquid storage container 4 breathes. Specifically, depending upon the pressure difference between pressure PG of the gas staying at the upper portion of the cooling liquid storage container 4 (upper portion of the liquid phase portion 41 and the gas drawing chamber 43) and the pressure PF of the air exhausted from the fuel cell 1 through the exhaust pipe 10 (or the supply air pressure), one of the gas within the cooling liquid storage container 4 and the air within the exhaust pipe 10 is moved toward any of directions towards the cooling liquid storage container 4 and towards the exhaust pipe 10. If the pressure of the gas PG is higher than the pressure of PF the exhaust air, the gas within the cooling liquid storage container 4 flows through the signal pressure pipe 5 from the cooling liquid container 4 towards the exhaust pipe 10, to push back the air, which is incorporated into the signal pressure pipe 5 from the side of the exhaust pipe 10, toward the side of the exhaust pipe 10, whereby the gas contained in the cooling liquid within the cooling liquid storage container 4 is exhausted into the exhaust pipe 10. If the pressure PG of the gas is lower than the pressure PF of the exhaust air, the cooling liquid within the cooling liquid storage container 4 is pushed back from the exhaust pipe 10 to the cooling liquid storage container 4, and the air flows in the cooling liquid storage container 4 to dilute the gas in the gas phase portion. This ventilates the gas phase portion in the cooling liquid storage container 4. The gas exhausted into the exhaust pipe 10 (for example, the fuel gas) is mixed with the air to be supplied to the fuel cell 1, and then combusted in the cathode of the fuel cell, after which it is exhausted.

Also, in the case of the configuration where the cooling liquid storage container 4 possesses the gas drawing chamber 43, it is effective for preventing the cooling liquid stayed within the cooling liquid storage container 4 from being leaked within the supply air pipe via the signal pressure pipe due to the vibration or tilting of the cooling liquid storage container 4.

Fourth Embodiment

Figure 4:
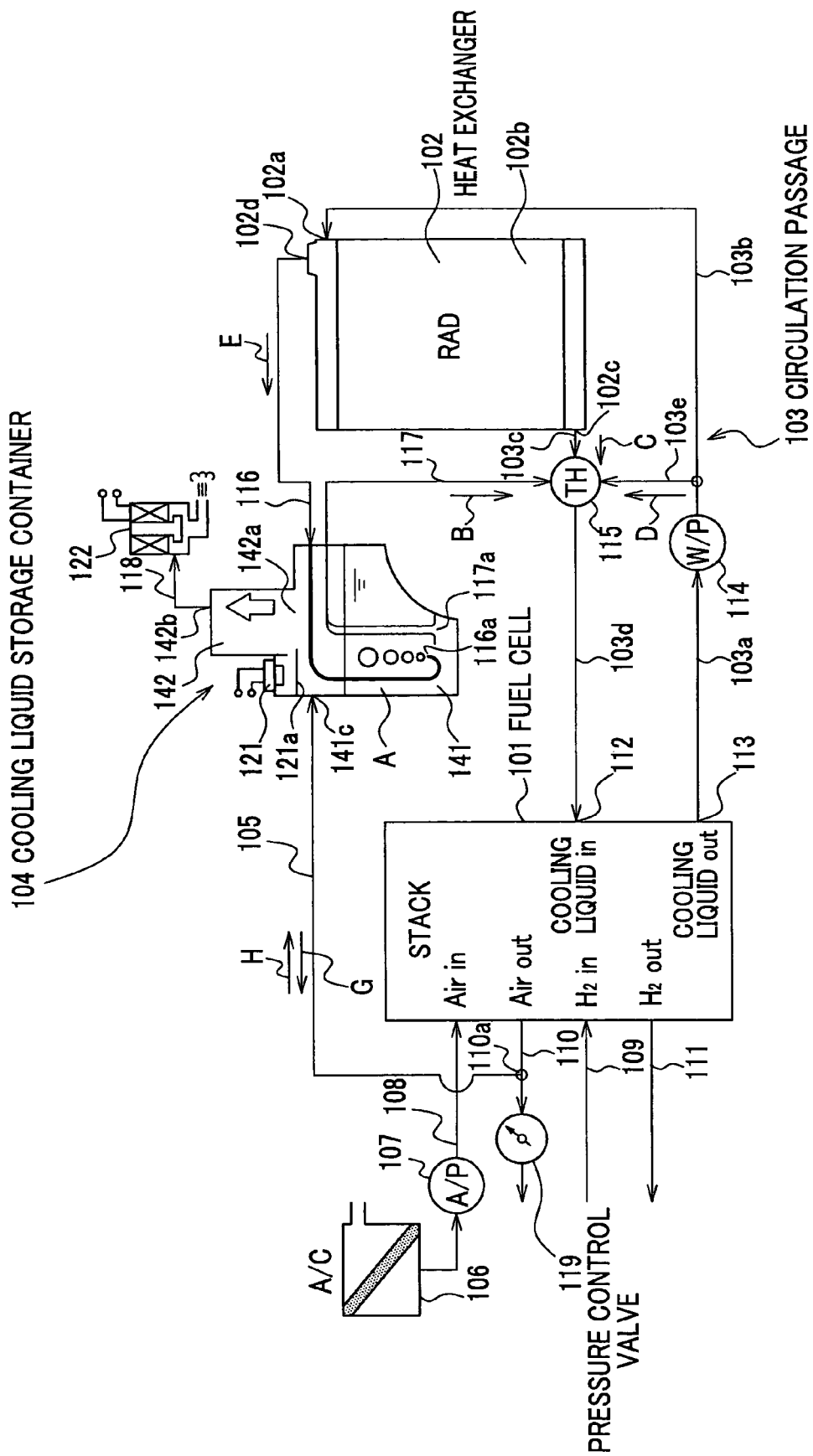
FIG. 4 is a block diagram showing the configuration of the apparatus for cooling a fuel cell according to the fourth embodiment.

FIG. 4 is a block diagram showing the configuration of the apparatus for cooling a fuel cell according to the fourth embodiment.

An apparatus for cooling a fuel cell according to the fourth embodiment is carried on an fuel cell electric vehicle (not shown), and is composed of a heat exchanger 102, which cools a cooling liquid supplied to a fuel cell 101, a circulation passage 103, which circulates the cooling liquid between the fuel cell 101 and the heat exchanger 102, a cooling liquid container 104, which stores a part of the cooling liquid within the circulation passage 103, and a ventilation pipe 105.

The fuel cell 101 is composed, for example, of a plurality units of fuel cell (single cell) composed of a polymer membrane electrode comprising a polymer ion-exchange membrane intervened between an anode and a cathode. When hydrogen gas is supplied to the anode as a fuel gas, and when air is supplied to a cathode as an oxidant gas, hydrogen ions generated at the anode are passed through the polymer membrane electrode to be migrated to the cathode. At the cathode, an electrochemical reaction between the migrated hydrogen ions and oxygen occurs by a catalyst in the cathode to produce water. Since this reaction is exothermic, in order to secure the reaction efficiency, the temperature of the fuel cell 1 is kept at approximately 70° C. by circulating cooling water on a surface of a separator opposing the anode or cathode side. The generated power is supplied to a driving motor (not shown) of an fuel cell electric vehicle to drive the vehicle.

The fuel cell 101 is an apparatus for generating power by a power generation reaction between an air, which is purified through an air cleaner 106 and which is supplied through an supply air pipe 108 by an air pump 107, and the fuel gas, which is supplied through a fuel gas supply pipe 109. After the power generation reaction, an air remaining unconsumed by the power generation reaction is exhausted from the fuel cell 1 through an exhaust air pipe 110, and a fuel gas remaining unconsumed by the power generation reaction is exhausted from the fuel cell 1 through an exhaust pipe 111 for a fuel gas. The fuel cell 101 also possesses an cooling liquid inlet 112 and a cooling liquid outlet 113. As the fuel gas, hydrogen, hydrocarbons, reformed gas in which hydrocarbon is reformed, methanol and the like can be mentioned.

The heat exchanger 102 possesses an inlet 102$a$, into which the cooling liquid returned from the fuel cell 101 by the circulation passage 103 flows, a body of the heat exchanger 102$b$, which cools down the cooling liquid by heat exchange between the cooling liquid and a secondary medium, such as wind generated by driving a vehicle, and an outlet 102$c$ from which the cooling liquid having been cooled due to the heat exchange flows. The heat exchanger 102 may be a liquid cooling system in which water or other medium is used as the secondary cooling medium or an air cooling system in which air is used as the secondary cooling medium.

The heat exchanger 102 also possesses outlets 102$d$ and 102$e$ for cooling liquid/gas, which flows parts of the cooling liquid flowing in from the inlet 2$a$ through the circulation passage 103 flow in a storage container for a cooling liquid.

The circulation passage 103 is a passage for circulating the cooling liquid between the fuel cell 101 and the heat exchanger 102 in a heat-exchangeable manner, and is composed of a flow-out passage 103a, a flowing passage 103b, a returning passage 103c, a flow-in passage 103d, and a regulated flow passage 103e.

The flow-out passage 103a is a passage which communicates an outlet 113 of the fuel cell 101 with a pump 114 for a cooling liquid, and in which the cooling liquid flowing out from the fuel cell flows.

The flowing passage 103b is a passage which communicates the pump 114 for a cooling liquid with the inlet 102a of the heat-exchanger 102, and in which the cooling liquid flowing through the flow-out passage 103b and being compressed by the pump 114 for a cooling liquid flows.

The returning passage 103c is a passage which communicates the outlet 102c of the heat exchanger 102 with a thermostat 115, and in which the cooling liquid flowing out from the inlet 102c flows to the thermostat.

The flow-in passage 103d is a passage which communicates the thermostat 115 with the inlet 12 of the fuel cell 101, and in which the cooling liquid flowing out from the thermostat 115 flows in the inlet 112 of the fuel cell 101.

The regulated flow passage 103e is a passage which communicates the flowing passage 103b with the thermostat, and in which parts of the cooling liquid flowing through the flowing passage 103b is joined with the cooling liquid flowing from the returning passage 103c into thermostat 115 so that the temperature of the cooling liquid supplied from the inlet 112 into the fuel cell 101 via the flowing passage 103d may be within a prescribed range.

The thermostat 115 is a device, which has a function that depending upon temperatures of cooling liquid B, flowing in from the heat exchanger 102 via the returning passage 103c, cooling liquid C, flowing in from the cooling liquid container 104 via the returning passage 103d, and cooling liquid D, flowing via the regulated flow passage 103e, opens or closes the flowing routes of the respective passages, mixes cooling liquids B, C, and D, keeps the temperature of the cooling liquid flowing out of the outlet 115e, passing through the flowing passage 103d, and being supplied to the fuel cell 101 from the inlet 112, at a prescribed temperature.

The cooling liquid storage container 104 is composed of a gas/liquid separation chamber 141 and a ventilation chamber 142 provided on the gas/liquid separation chamber 141 projecting upwardly and communicated with the gas/liquid separation chamber 141 via an opening 142a, and further possesses a gas exhaust mechanism. The cooling liquid storage container 104 has a function of storing parts of the cooling liquid within the circulation passage 103 and a gas/liquid separation function of staining the gas separated from the cooling liquid on an upper portion.

In the cooling liquid storage container 104, the gas/liquid separation chamber 141 are communicated with the heat exchanger 102 via the passage 116 for drawing a gas in the cooling liquid. The edge portion 116a of the passage 16 for drawing a gas in a cooling liquid is placed on a portion lower than the liquid surface of cooling liquid A staying in the gas/liquid separation chamber 141 so that the gas contained in the cooling liquid flowing in the heat exchanger 102 is separated from the liquid, is floated on an upper space of the gas/liquid separation chamber 141, and is stayed.

The gas/liquid separation chamber portion 141 is connected to the circulation passage 103 via the passage 117 for returning a cooling liquid. The edge portion of the passage 1017 for returning a cooling liquid is placed on a portion lower than the liquid surface of cooling liquid A staying in a lower portion of the cooling liquid storage container 104 so that the cooling liquid flowing within the circulation passage 103 and the cooling liquid within the cooling liquid storage container 104 may be communicated.

Furthermore, the gas/liquid separation chamber portion 141 is communicated with the an exhaust air pipe 110 via the ventilation pipe 105. The ventilation chamber 142 of the cooling liquid storage container 104 is communicated with the exhaust air pipe 110. Also, the ventilation chamber 142 of the cooling liquid storage container 104 is provided on an upper portion of the gas/liquid separation chamber portion 141 projecting upwardly, and is communicated with the gas/liquid separation chamber portion 141 via an opening 142a, and an exhaust passage 118 for ventilation is communicated with an exhaust opening 142b.

In the cooling apparatus according to this embodiment, the ventilation chamber 142, the ventilation pipe 105, a pressure control valve 119 placed on the way to the exhaust air pipe 110 at a downstream of a communication point 110a with the ventilation pipe 105, the exhaust opening 142b, and the exhaust passage 118 for ventilation communicated with the exhaust opening 142b make up a gas exhaust mechanism in which the fuel gas staying within the cooling liquid storage container 104 is ventilated by the air exhausted from the fuel cell.

The pressure control valve 19 controls the pressure of the exhaust air exhausted from the fuel cell through the exhaust air pipe 110, and the control of the pressure of the exhaust air by the pressure control valve 19 controls the ventilation within the cooling liquid storage container 104.

Next, a process for cooling a fuel cell in the apparatus for cooling a fuel cell according to the fourth embodiment will be described. Also, the exhaust of the fuel gas contained in the cooling liquid storage container 4 will be described.

In the apparatus for cooling a fuel cell, the air, which is purified by the air cleaner 106, and then supplied within the fuel cell 101 through the air pump 107, and the fuel gas supplied within the fuel cell 101 through fuel gas supply pipe 109 are brought about the power generation reaction to generate power. After the power generation reaction, an air remaining unconsumed by the power generation reaction is exhausted from the fuel cell 101 through the exhaust air pipe 110, and a fuel gas remaining unconsumed by the power generation reaction is exhausted from the fuel cell 101 through an exhaust fuel gas pipe 111.

The heat generated during the course of the power generation reaction is supplied within the fuel cell 101 from the inlet 112, and is absorbed by the cooling liquid flowing through the passage provided within the fuel cell 101 so as to keep the temperature of the fuel cell 101 at a prescribed temperature.

The cooling liquid having absorbed the heat flows from the outlet 113 out of the fuel cell 101, and flows through the flow out passage 103a of the circulation passage 103, the pump 114 for a cooling liquid, and the flowing passage 103b, on this order, is compressed by the pump 114 for a cooling liquid, and flows in the heat exchanger 102 at which the cooling liquid is allowed to cool down by heat-exchange with the secondary cooling medium at the body 102b of the heat exchanger. After the heat exchange, the cooling liquid flows out from the outlet 102c of the heat exchanger 102, flows within the returning passage 103c, and flows in the thermostat 115.

At the thermostat 115, depending upon temperatures of cooling liquid B, flowing in from the heat exchanger 102 via the returning passage 103c, cooling liquid C, flowing in from the cooling liquid container 104 via the returning passage 103d, and cooling liquid D, flowing via the regulated flow passage 103e, flowing routes of the respective passages are opened or closed, to thereby mix cooling liquids B, C, and D, whereby the cooling liquid whose temperature is regulated to a prescribed temperature flows out from the outlet 115a, through the flow-in passage 103d to be supplied into the fuel cell 101. The interior of the fuel cell 101 is cooled by the cooling liquid thus supplied.

As described above, the cooling apparatus according to the first embodiment of the present invention can keep the temperature within the fuel cell 101 at a prescribed temperature by circulating the cooling liquid between the fuel cell 101 and the heat exchanger 102 via the circulation passage 103, making it possible to stably operate the fuel cell.

In the cooling liquid storage container 4, parts E of the cooling liquid flowing into the heat exchanger 102 from the inlet 102a flow through from a cooling liquid/gas outlet 102d through the passage 116 for drawing a gas and flow into the gas/liquid separate chamber 141 of the cooling liquid storage container 104 from the edge 116a of the passage 116 for drawing a gas. At this time, the gas contained in the cooling liquid is separated, floats from the liquid surface of the cooling liquid A to stay at the upper space (gas phase portion). At this time, the cooling liquid stays in the lower portion of the gas/liquid separation chamber 141 of the cooling liquid storage container 4. Cooling liquid A staying in the lower portion of the gas/liquid separation chamber 141 flows in the thermostat 115 as cooling liquid B via the passage 117 for returning a cooling liquid. Since the cooling liquid container 4 is communicated with the exhaust air pipe 110, the pressure of the supply air supplied by the exhaust air pipe 110 loads to the cooling liquid flowing in flow-in passage 103d of the circulation passage 103. The pressure of the cooling liquid within the gas phase of the cooling liquid container 104 is substantially the same as the pressure of the supply air. Although the pressure loss occurs by the flowing of the cooling liquid within the circulation passage 103, the pressure loss is substantially constant independent of the pressure of the cooling liquid within the circulation passage 103, and, thus, the pressure difference between the pressure of the cooling liquid supplied to the fuel cell 101 and the pressure of the air supplied to the fuel cell 101 is set so that the pressure of the cooling liquid is lower than that of the air as the pressure loss. By such a configuration, the pressure difference between the passage for cooling liquid and the passage for supply air within the fuel cell 101 composed of a laminated construction is kept at a prescribed range.

By communicating the cooling liquid storage 4 with the exhaust air pipe 110 via the ventilation pipe 105, the cooling liquid storage container 104 breathes depending upon the pressure difference between pressure of the gas separated from the cooling liquid and staying at the upper portion of the cooling liquid storage container 104 and the pressure of the exhaust air flowing into the exhaust air pipe 110. Specifically, depending upon the pressure difference between the pressure PG at the gas phase portion formed by the gas staining at an upper portion of the cooling liquid storage container 104 and the pressure of the exhaust air PA exhausted from the fuel cell 101 through the exhaust air pipe 110 (pressure of the exhaust air), the gas within the cooling liquid storage container 104 or the air within the exhaust air pipe 110 is pushed back within the ventilation pipe 105 in any of the directions towards the cooling liquid storage container 104 or the exhaust air pipe 110. If the pressure PG of the gas is higher than the pressure PA, the gas within the cooling liquid storage container 104 flows through the ventilation pipe 105 from the cooling liquid container 104 towards the exhaust air pipe 110 (to the direction shown by Arrow G in FIG. 4), to push back the air, which is incorporated into the ventilation pipe 105 from the side of the exhaust air pipe 110, toward the side of the exhaust air pipe 110, whereby the gas contained in the gas within the cooling liquid storage container 4 is exhausted into the exhaust air pipe 110. If the pressure PG of the gas is lower than the pressure PA of the air, the gas within the cooling liquid storage container 4 is pushed back from the exhaust air pipe 110 to the cooling liquid storage container 104 (as shown in Arrow H), and the air flows in the cooling liquid storage container 104, diluting the gas in the cooling liquid storage container 104.

Furthermore, by breathing of the cooling liquid storage container 104, the pressure at the gas phase portion of the cooling liquid storage container 104 becomes substantially the same (PA=PG). The pressure of the cooling liquid within the cooling liquid storage tank 104 becomes substantially the same as that of the gas phase portion, and thereafter the pressure loss occurs before the cooling liquid is supplied to the fuel cell 1 due to passing it through the circulation passage 103. However, the pressure loss is substantially constant independent of the pressure of the cooling liquid within the circulation passage 103, and, thus, the pressure difference between the pressure of the cooling liquid supplied to the fuel cell 101 and the pressure of the exhaust air exhausted from the fuel cell 101 is set so that the pressure of the cooling liquid is lower than that of the exhaust air as the pressure loss (PA>PL). Specifically, when the pressure (PA) of the exhaust air is increased or decreased due to change in output of the fuel cell 101 or such, the pressure changed accompanying therewith is transmitted to the cooling liquid within the liquid storage container 104, whereby the relation of PA>PL can be maintained, maintaining the pressure balance between the cooling liquid and the supply air within the fuel cell 101.

In this embodiment, in addition to the ventilation due to the breathing of the cooling liquid storage container 104, the ventilation within the cooling liquid storage container 104 can further be performed by the gas exhaust mechanism. The pressure of the exhaust air, which flows through the exhaust air pipe 110 and then exhaust is controlled by the pressure control valve 119 to be PA>PG, whereby the air within the exhaust air pipe 110 is passed through the ventilation pipe 105 and flows in the gas/liquid separation chamber 141 of the cooling liquid storage container 104 from the inlet 141c. The air flowing in the gas/liquid separation chamber 141 is mixed with the fuel gas staying in the cooling liquid storage container 104 (gas/liquid separation chamber 141), the mixed gas is then passed through the ventilation chamber 142 to form a current of the gas exhausted from the exhaust opening 142b into the exhaust passage 118 for ventilation (hereinafter referred to as "ventilation current". For example, If the pressure control valve 119 is turned down to increase the pressure of the exhaust air at the side of the exhaust air pipe 110, the exhaust air flows from the exhaust air pipe 110 through the ventilation pipe 108 to from the ventilation current in the direction of the cooling liquid storage container 104 (the direction shown by G), whereby the interior of the cooling liquid storage container 104 can be ventilated. This gas exhaust mechanism may be always actuated or may be actuated as occasion may demand. If the gas exhaust mechanism is always actuated at the time of operating the fuel cell 101, i.e., if the pressure control valve 119 is control to set the pressure of the exhaust air to always be PA>PG, the interior of the cooling liquid storage container 104 can be ventilated to exhaust the gas separated from the cooling liquid and staying in the cooling liquid storage container 104, especially the fuel gas to keep the concentration of the fuel gas in the liquid phase portion of the cooling liquid storage container 104.

Furthermore, in the fourth embodiment, depending upon the gas concentration within the cooling liquid storage container 104, the gas exhaust mechanism may control the exhaust of the gas from the cooling liquid storage container 104. For example, as shown in FIG. 4, a meter 121 for a fuel gas concentration is provided on the gas/liquid separation chamber 141 of the cooling liquid storage container 104, and when the fuel gas concentration measured by the meter 121 for a fuel gas concentration is equal to or higher than a prescribed concentration, the pressure control valve 119 may be turned down to be PG>PA, whereby the ventilation current may be formed. By such a configuration, the gas in the gas phase portion formed in the cooling liquid storage container 104 is mixed with the air flowing in the gas/liquid separation chamber 141 by the ventilation pipe 105, the diluted gas is further passed through the ventilation chamber 142 and then exhausted from the exhaust opening 142b via the exhaust passage 118 for ventilation. At this time, the meter 121 for a fuel gas concentration may possess a shielding plate 121a not so as to be in contact with the cooling liquid A due to the vibration or tilting of the cooling liquid storage container 104.

Also, in the fourth embodiment, depending upon the gas concentration within the cooling liquid storage container 104, the gas exhaust mechanism may control a flow amount of the ventilation current to increase the exhaust amount of the gas from the cooling liquid storage container 104. For example, as shown in FIG. 4, by controlling opening and closing a valve 122, which can control opening and closing of the valve, the exhaust amount of the mixed gas exhausted from the exhaust passage 118 for ventilation can be increased. Specifically, by opening the valve when the fuel gas concentration is equal to or higher than a prescribed concentration, PG is temporally decreased to make a relation of PA>PG to thereby increase the ventilation current by the air, so that the fuel gas of the gas phase portion is diluted to increase the exhaust amount of the gas. This makes it possible to control the ventilation amount of the cooling liquid storage container 104. Examples of the valve 122, which can control opening and closing of the valve, include, but are not restricted to, electromagnetic valves and diaphragm valves.

Furthermore, in the fourth embodiment, when the fuel gas concentration in the cooling liquid storage container 104 is equal to or higher than a prescribed concentration, the pressure within the exhaust air pipe 110 is increased whereby the ventilation current can be increased by the difference between the pressure within the cooling liquid storage container 104 and the pressure within the exhaust air pipe 110 and whereby the dilution of the fuel gas within the cooling liquid storage container 104 by the ventilation current and the exhaust from the exhaust opening 142b is increased to decrease the concentration of the fuel gas. At this time, the pressure within the exhaust air pipe 110 can be increased by turning down the pressure control valve 119.

Furthermore, in the fourth embodiment, when the fuel gas concentration within the cooling liquid storage container 104 is decreased to a prescribed concentration by increasing the pressure within the exhaust air pipe 110, the gas exhaust mechanism may be opened to exhaust the gas within the cooling liquid storage container 104. By such a configuration as described above, after the fuel gas concentration within the cooling liquid storage container 104 is decreased, and the gas within the cooling liquid storage container 104 is exhausted by the gas exhaust mechanism. Consequently, the gas whose fuel gas concentration is surely decreased can be exhausted out. The fuel gas concentration within the cooling liquid storage container 104 can be detected by providing the meter 121 for a fuel gas concentration. The opening of the gas exhaust mechanism may be carried out as shown in FIG. 4 by the valve 122, which can control opening and closing of the valve, provided on the exhaust passage 118 for ventilation communicated with the exhaust opening 142b.

Also, in the fourth embodiment, when the ventilation performance through the cooling liquid storage container 104 is lacking, the ventilation within the cooling liquid storage container 104 may be performed by opening the gas exhaust mechanism. For example, the fuel gas concentration cannot yet been not higher than a prescribed concentration even after a prescribed period of time is elapsed after the fuel gas concentration measured by the meter 121 for a fuel gas concentration is equal to or higher than a prescribed concentration, the ventilation within the cooling liquid storage container 104 may be performed by opening the gas exhaust mechanism. The opening of the gas exhaust mechanism may be carried out by opening and closing the valve 122, which can control opening and closing of the valve.

Specifically, the pressure within the cooling liquid storage container 104 is decreased when the fuel gas concentration within the cooling liquid storage container 104 arrives at the concentration not lower than a prescribed concentration, the flow amount of the ventilation current may be increased by decreasing the pressure within the cooling liquid storage container 104. For example, when the fuel gas concentration within the cooling liquid storage container 104 arrives at the concentration not lower than a prescribed concentration, the valve 22 is opened to decrease the pressure within the cooling liquid storage container 104 This can increase the ventilation current due to pressure difference between the pressure within the cooling liquid storage container 104 and the pressure within the exhaust air pipe 110, whereby the dilution of the fuel gas within the cooling liquid storage container 104 by the ventilation current and the exhaust from the exhaust opening 142b is increased to decrease the concentration of the fuel gas.

Fifth Embodiment

Next, an apparatus for cooling a fuel cell according to the fifth embodiment of the present invention shown in FIG. 5 will be described.

Figure 5:
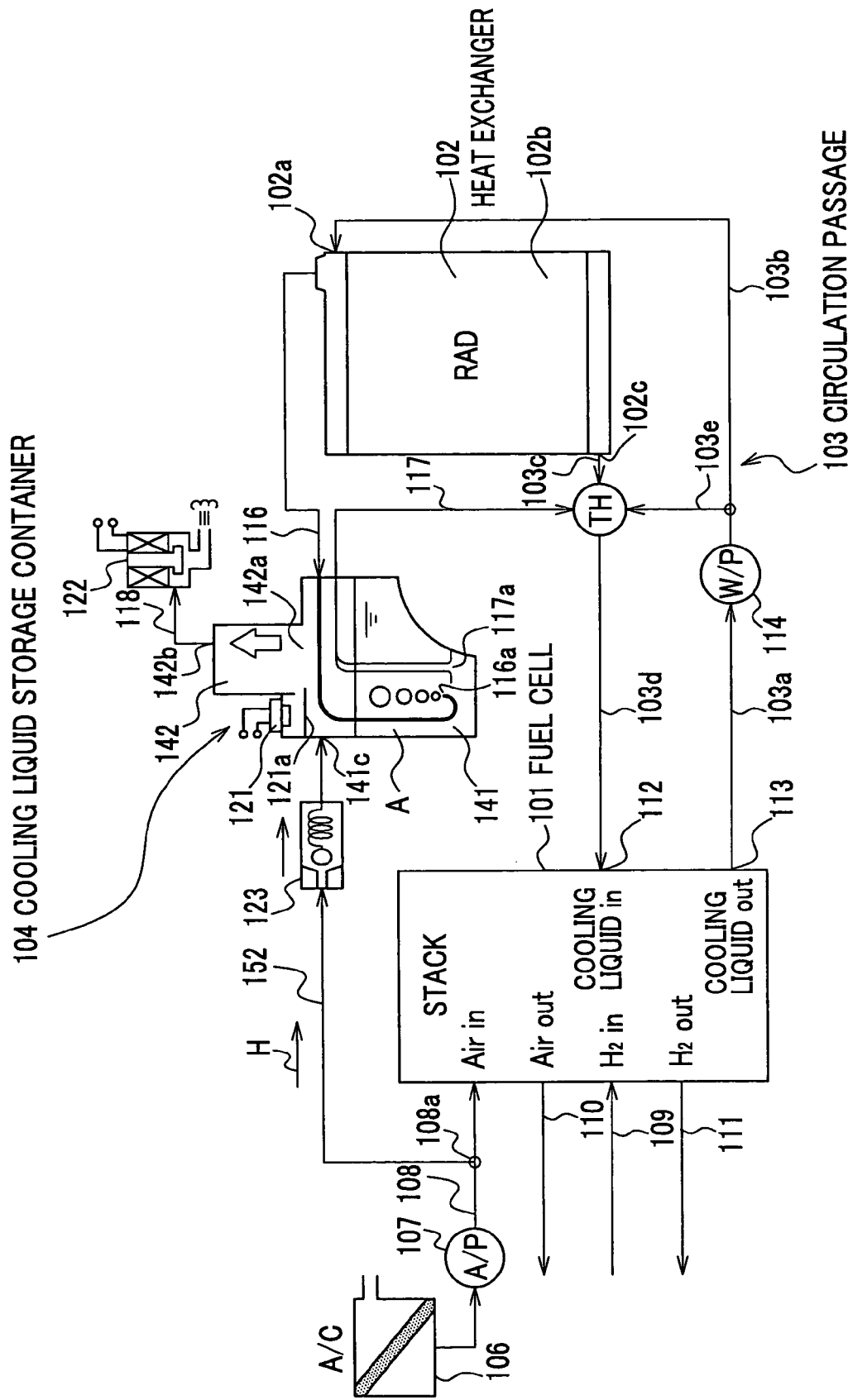
FIG. 5 is a block diagram showing the configuration of the apparatus for cooling a fuel cell according to the fifth embodiment.

FIG. 5 is a block diagram showing the configuration of the apparatus for cooling a fuel cell according to the fifth embodiment.

The apparatus for cooling a fuel cell according to the fifth embodiment of the present invention shown in FIG. 5 has the same configuration in terms of possessing the circulation passage 103 (103a, 103b, 103c, 103d, and 103e), which circulates the cooling liquid between the fuel cell 101 and the heat exchanger 102, the passage 116 for drawing a gas in a cooling liquid, which supplies parts of the cooling liquid from the heat exchanger 102 to the cooling liquid storage container 104, the thermostat 115, which keeps the temperature of the cooling liquid flowing within the circulation passage 103, the passage 117 for returning a cooling liquid, which returns the cooling liquid from the cooling liquid storage container 104 to the circulation passage 103, the gas/liquid separation chamber 141, and the ventilation chamber 142 as those in the fourth embodiment. Consequently, configurations different from those of the fourth embodiment will be focused to describe the apparatus for cooling a fuel cell according to the fifth embodiment. The same numbers or symbols are assigned to the parts having the configuration same as those of the fourth embodiments, and the description of such parts will be omitted.

In the cooling apparatus according to the fifth embodiment, similar to the fourth embodiment, the temperature of cooling water circulated between the fuel cell 101 and the heat exchanger 102 via the circulation passage 103 is kept at constant by the thermostat 15.

Furthermore, in the cooling apparatus according to this embodiment, the ventilation chamber 142, the ventilation pipe 152, an air pump 107 placed on the way to the supply air pipe 108 at an upstream of a communication point 108a with the ventilation pipe 152, means 123 for controlling ventilation placed on the way to the ventilation pipe 152, the exhaust opening 142b, and the exhaust passage 118 for ventilation communicated with the exhaust opening 142b make up a gas exhaust mechanism in which the fuel gas staying within the cooling liquid storage container 104 is ventilated by the supply air supplied to the fuel cell.

In this embodiment, the ventilation within the cooling liquid storage container 104 can be performed by this gas exhaust mechanism. Parts of the air supplied to the fuel cell 101 by the air pump 107 are passed through the ventilation pipe 152 and through the means 123 for controlling ventilation and flow in the gas/liquid separation chamber 141 of the cooling liquid storage container 104. The air flowing in the gas/liquid separation chamber 141 is mixed with the fuel gas staying within the cooling liquid storage container 104 (within the gas/liquid separation chamber 141) to form a current passing though the ventilation chamber 142 and exhausted from the exhaust opening 142b into the exhaust passage 118 for ventilation, i.e., the ventilation current. For example, parts of the supply air are flow from the supply air pipe 108 towards the direction of the cooling liquid storage container 104 (the direction shown by H in the figure) to form the ventilation current, which ventilates the interior of the cooling liquid storage container 104. This gas exhaust mechanism may be always actuated or may be actuated as occasion may demand. If the gas exhaust mechanism is always actuated at the time of operating the fuel cell 101, the interior of the cooling liquid storage container 104 can be ventilated to mix the gas separated from the cooling liquid and staying in the cooling liquid storage container 104, especially the fuel gas, with the supply air to be diluted and exhausted to keep the concentration of the fuel gas in the liquid phase portion of the cooling liquid storage container 104.

In the cooling apparatus according to the fifth embodiment, when the means 123 for controlling a flow amount of a ventilation current is provided on the way to the ventilation pipe 152, it can control the flow amount of the ventilation current flowing in the ventilation pipe 105, and is effective for preventing the cooling liquid stayed in the cooling liquid storage container 104 from being leaked within the supply air pipe 108 via the ventilation pipe 152 due to the vibration or tilting of the cooling liquid storage container 104. For example, at the time of driving the fuel cell carried vehicle, even if the cooling liquid storage container is vibrated or tilted, the cooling liquid can be prevented from being leaked into the supply air pipe, which is effective for continuous power generation by the fuel cell in a stable manner. An example of the means 23 for controlling a flow amount of a ventilation current, which can be mentioned, is a check valve.

Furthermore, in the fifth embodiment, depending upon the concentration of the fuel gas concentration in the gas phase portion within the cooling liquid storage container 104, the gas exhaust mechanism may control the exhaust of the gas from the cooling liquid storage container 104. For example, as shown in FIG. 5, meter 121 for a fuel gas concentration is provided on the gas phase portion of the cooling liquid storage container 104, and when the fuel gas concentration measured by the meter 121 for a fuel gas concentration is equal to or higher than a prescribed concentration, the flow amount of the air may be increased by increasing the pressure of the supply air by the air pump 107 or by increasing the ventilation current by the means 123 for controlling a ventilation current, whereby the gas formed within the cooling liquid storage container 104 is mixed and diluted with the air flowing from the ventilation pipe 105 the gas/liquid separation chamber 141 in a larger amount, and the resulting mixed gas is passed through the ventilation chamber 141 and exhausted from the exhaust passage 118 for ventilation via the exhaust opening 142b. At this time, the meter 121 for a fuel gas concentration may possess a shielding plate 121a not so as to be in contact with the cooling liquid A due to the vibration or tilting of the cooling liquid storage container 104.

Also, in the fifth embodiment, depending upon the concentration of the fuel gas concentration in the gas phase portion within the cooling liquid storage container 104, the gas exhaust mechanism may increase the exhaust amount of the gas from the cooling liquid storage container 104. For example, as shown in FIG. 5, the valve 122, which can control opening and closing of the valve is provided on the exhaust passage 118 for ventilation, the amount of the mixed gas exhausted from the exhaust passage 118 for ventilation, i.e., the exhaust amount of the gas, can be increased by opening the valve 22. Specifically, by opening the valve 22 when the fuel gas concentration is equal to or higher than a prescribed concentration, PG is temporally decreased to make a relation of PA>PG to thereby increase the ventilation current by the air, so that the fuel gas of the gas phase portion is diluted to increase the exhaust amount of the gas. This makes it possible to control the ventilation amount of the cooling liquid storage container 104. Examples of the valve 122, which can control opening and closing of the valve, include, but are not restricted to, electromagnetic valves and diaphragm valves.

Also, in the fifth embodiment, depending upon the concentration of the fuel gas concentration in the gas phase portion within the cooling liquid storage container 104, the pressure within the air supply pipe 108 is increased whereby the ventilation current can be increased by the difference between the pressure within the cooling liquid storage container 104 and the pressure within the supply air pipe 108 and whereby the dilution of the fuel gas within the cooling liquid storage container 104 by the ventilation current and the exhaust from the exhaust opening 142b is increased to decrease the concentration of the fuel gas. At this time, the pressure within the supply air pipe 108 can be increased by the air pump 107.

Furthermore, in the fourth embodiment, when the fuel gas concentration within the cooling liquid storage container 104 is decreased to a prescribed concentration by increasing the pressure within the supply air pipe 108, the gas exhaust mechanism may exhaust the gas within the cooling liquid storage container 104. By such a configuration as described above, after the fuel gas concentration within the cooling liquid storage container 104 is decreased, and the gas within the cooling liquid storage container 104 is exhausted by the gas exhaust mechanism. Consequently, the gas whose fuel gas concentration is surely decreased can be exhausted out. The fuel gas concentration within the cooling liquid storage container 104 can be detected by providing the meter 121 for a fuel gas concentration. The exhaust of the gas by the gas exhaust mechanism can be carried out as shown in FIG. 5 by opening the valve 122, which can control opening and closing of the valve, provided on the exhaust passage 118 for ventilation communicated with the exhaust opening 142b.

Specifically, when the fuel gas concentration is equal to or higher than a prescribed concentration, the pressure within the cooling liquid storage container 104 is decreased to a prescribed concentration by the gas exhaust mechanism to increase the flow amount of the ventilation current. For example, when the fuel gas concentration within the cooling liquid storage container 104 arrives at the concentration not lower than a prescribed concentration, the valve 22 is opened to decrease the pressure within the cooling liquid storage container 104 This can increase the ventilation current due to pressure difference between the pressure within the cooling liquid storage container 104 and the pressure within the exhaust air pipe 110, whereby the dilution of the fuel gas within the cooling liquid storage container 104 by the ventilation current and the exhaust from the exhaust opening 142*b* is increased to decrease the concentration of the fuel gas.

Sixth Embodiment

Next, an apparatus for cooling a fuel cell according to the sixth embodiment of the present invention shown in FIG. 6 will be described.

Figure 6:
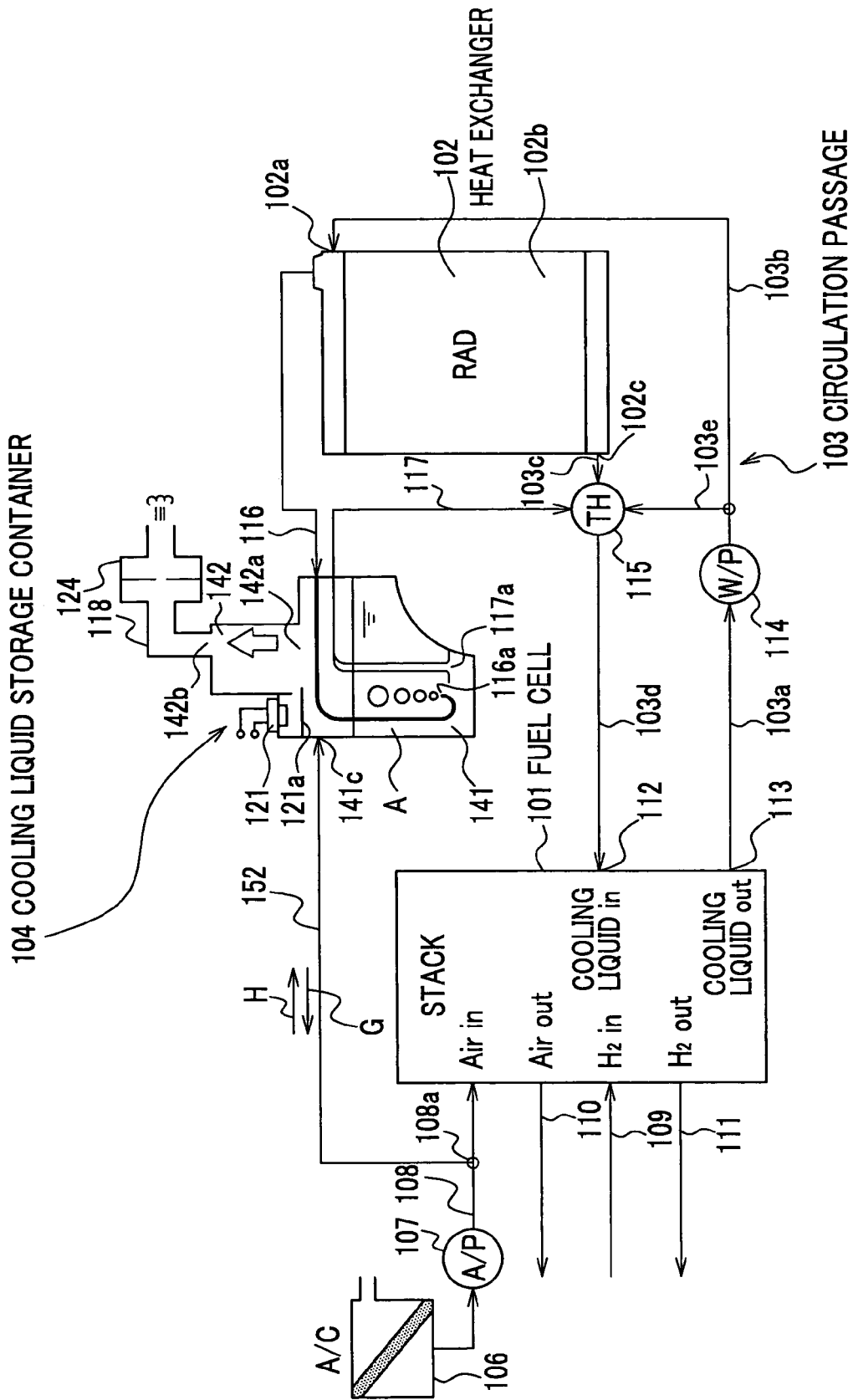
FIG. 6 is a block diagram showing the configuration of the apparatus for cooling a fuel cell according to the sixth embodiment.

FIG. 6 is a block diagram showing the configuration of the apparatus for cooling a fuel cell according to the sixth embodiment.

The apparatus for cooling a fuel cell according to the sixth embodiment of the present invention shown in FIG. 6 has the same configuration in terms of possessing the circulation passage 103 (103*a*, 103*b*, 103*c*, 103*d*, and 103*e*), which circulates the cooling liquid between the fuel cell 101 and the heat exchanger 102, the passage 116 for drawing a gas in a cooling liquid, which supplies parts of the cooling liquid from the heat exchanger 102 to the cooling liquid storage container 104, the thermostat 115, which keeps the temperature of the cooling liquid flowing within the circulation passage 103, the passage 117 for returning a cooling liquid, which returns the cooling liquid from the cooling liquid storage container 104 to the circulation passage 103, the gas/liquid separation chamber 141, and the ventilation chamber 142 as those in the fourth embodiment. Consequently, configurations different from those of the fourth embodiment will be focused to describe the apparatus for cooling a fuel cell according to the sixth embodiment. The same numbers or symbols are assigned to the parts having the configuration same as those of the fourth embodiments, and the description of such parts will be omitted.

In the cooling apparatus according to the sixth embodiment, similar to the fourth embodiment, the temperature of cooling water circulated between the fuel cell 101 and the heat exchanger 102 via the circulation passage 103 is kept at constant by the thermostat 15.

At this time, by communicating the cooling liquid storage 4 with the supply air pipe 108 via the ventilation pipe 152, the cooling liquid storage container 104 breathes depending upon the pressure difference between pressure of the gas separated from the cooling liquid and staying at the upper portion of the gas/liquid separation chamber 141 and a gas phase portion formed within the ventilation chamber 142 and the pressure of the supply air flowing into the supply air pipe 108. Specifically, depending upon the pressure difference between the pressure PG at the gas phase portion formed by the gas staining in the upper portion of the cooling liquid storage container 104 (the gas/liquid separation chamber 141 and the ventilation chamber 142) and the pressure of the supply air PA supplied into the fuel cell 101 via the supply air pipe 108 (pressure of the supply air), the gas within the cooling liquid storage container 104 or the air within the exhaust air pipe 110 is pushed back within the ventilation pipe 105 in any of the directions towards the cooling liquid storage container 104 or the supply air pipe 108.

If the pressure PG of the gas is higher than the pressure PA, the gas within the cooling liquid storage container 104 flows through the ventilation pipe 105 from the cooling liquid container 104 towards the supply air pipe 108 (to the direction shown by Arrow G in FIG. 5), to push back the air, which is incorporated into the ventilation pipe 105 from the side of the supply air pipe 108, toward the side of the supply air pipe 108, whereby the gas contained in the gas within the cooling liquid storage container 4 is exhausted into the supply air pipe 108. If the pressure PG of the gas is lower than the pressure PA of the air, the gas within the cooling liquid storage container 4 is pushed back from the supply air pipe 108 to the cooling liquid storage container 104 (the direction reverse to Arrow G: Arrow H in FIG. 6), and the air flows in the cooling liquid storage container 104, diluting the gas in the cooling liquid storage container 104. This ventilates the gas phase portion of the cooling liquid storage container 104. Furthermore, the gas exhausted into the supply air pipe 108 (for example, the fuel gas) is mixed with the air to be supplied to the fuel cell 101, which is catalytically reacted by a catalyst of the cathode of the fuel cell 101.

Furthermore, in the cooling apparatus according to this embodiment, the ventilation chamber 142, the ventilation pipe 152, an air pump 107 placed on the way to the supply air pipe 108 at an upstream of a communication point 108*a* with the ventilation pipe 152, the exhaust opening 142*b*, the exhaust passage 118 for ventilation communicated with the exhaust opening 142*b*, and an orifice 124 provided on the way to the exhaust passage 118 for ventilation make up a gas exhaust mechanism in which the fuel gas staying within the cooling liquid storage container 104 is ventilated by the supply air supplied to the fuel cell. The orifice 124 serves as the means for controlling a ventilation current, and turns down the cross-section of the ventilation of the exhaust passage 118 for ventilation. The flow amount of the mixed gas flowing in the exhaust passage 118 for ventilation and exhausted can be controlled by the orifice 124 to stably maintain the ventilation within the cooling liquid storage container 104. Specifically, the flow amount of the ventilation current sufficient for the ventilation within the cooling liquid storage container 104 can be maintained and excessive ventilation can be prevented.

In this embodiment, in addition to the ventilation due to the breathing of the cooling liquid storage container 104, the ventilation within the cooling liquid storage container 104 by this gas exhaust mechanism can be performed. When the pressure of the supply air supplied to the fuel cell through the supply air pipe 108 is controlled by the air pump 107 to be PA>PG, the air within the supply air pipe 108 is passed through the ventilation pipe 152 and then flows in the gas/liquid separation chamber 141 of the cooling liquid storage container 104 from the inlet 141*c*. The air flowing in the gas/liquid separation chamber 141 is mixed with the fuel gas staying within the cooling liquid storage container 104 (within the gas/liquid separation chamber 141) to form a current passing though the ventilation chamber 142 and exhausted from the exhaust opening 142*b* into, the exhaust passage 118 for ventilation, i.e., the ventilation current. For example, when the pressure of the supply air at the side of the supply air pipe 108 is increased to be PA>PG, the supply air is passed through the ventilation pipe 152 to flow in the direction of the cooling liquid storage container 104 (the direction shown by H in the figure) to form the ventilation current, ventilating the interior of the cooling liquid storage container 104. This gas exhaust mechanism may be always actuated or may be actuated as occasion may demand. If the gas exhaust mechanism is always actuated at the time of operating the fuel cell 101, i.e., the air pump 107 is controlled to control the pressure of the supply air to always be PA>PG, the interior of the cooling liquid storage container 104 can be ventilated to exhaust the gas separated from the cooling liquid and staying in the cooling liquid storage container 104, especially the fuel gas. This makes it possible to keep the fuel gas concentration in the gas phase portion of the cooling liquid storage container 104 at low.

In the cooling apparatus according to the sixth embodiment, depending upon the gas concentration within the cooling liquid storage container 104, the gas exhaust mechanism may control the exhaust of the gas from the cooling liquid storage container 104. For example, as shown in FIG. 6, a meter 121 for a fuel gas concentration is provided on the gas/liquid separation chamber 141 of the cooling liquid storage container 104, and when the fuel gas concentration measured by the meter 121 for a fuel gas concentration is equal to or higher than a prescribed concentration, the pressure of the supply air by the air pump 107 may be increased to control to be controlled to be PA>PG, whereby the ventilation current may be formed. By such a configuration, the gas in the gas phase portion formed in the cooling liquid storage container 104 is mixed and diluted with the air flowing in the gas/liquid separation chamber 141. The mixed gas is further passed through the ventilation chamber 142 and then exhausted from the exhaust opening 142b via the exhaust passage 118 for ventilation. At this time, the meter 121 for a fuel gas concentration may possess a shielding plate 121a not so as to be in contact with the cooling liquid A due to the vibration or tilting of the cooling liquid storage container 104.

Furthermore, in the sixth embodiment, the pressure within supply air pipe 108 is increased when the fuel gas concentration within the cooling liquid storage container 104 arrives at the concentration not lower than a prescribed concentration, whereby the ventilation current can be increased due to the pressure difference between the pressure within the cooling liquid storage container 4 and the pressure within the supply air pipe 108, whereby the dilution of the fuel gas within the cooling liquid storage container 104 by the ventilation current and the exhaust from the exhaust opening 142b may be increased to decrease the concentration of the fuel gas. At this time, the pressure within the supply air pipe 108 can be increased by the air pump 107.

EXAMPLES

Example 1

Next, a fuel cell possessing a cooling apparatus having a configuration of the second embodiment and utilizing hydrogen as the fuel cell was carried on a vehicle, and the breathing of the cooling liquid storage container 4 was experimented. The results are shown in FIG. 7 and FIG. 8.

Figure 7:
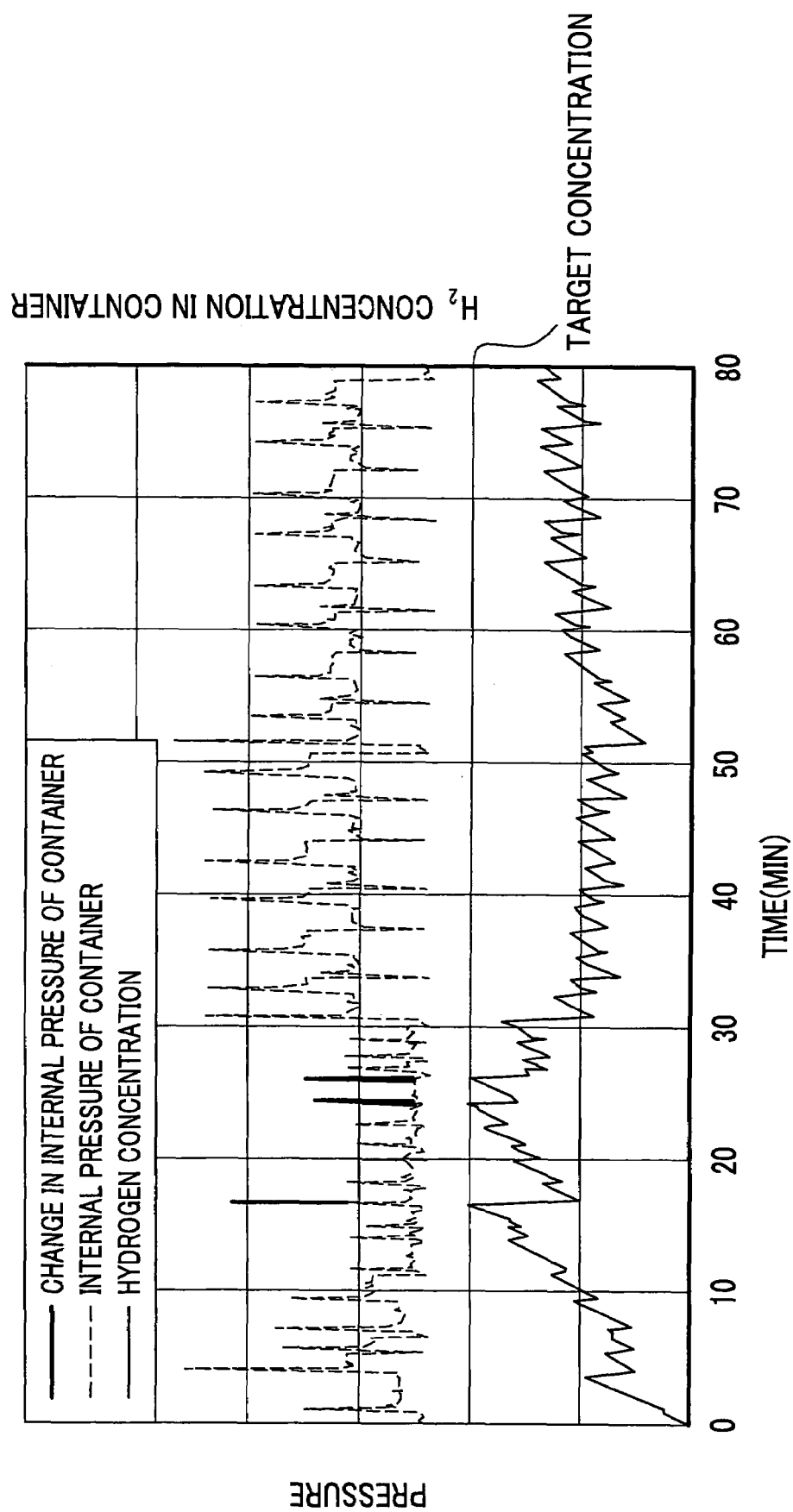
FIG. 7 shows change in the pressure of the gas within the cooling liquid storage container (internal pressure) and the hydrogen concentration as for the breathing of the cooling liquid storage container in the cooling apparatus of the second embodiment.

FIG. 7 shows change in the pressure of the gas within the cooling liquid storage container 4 (internal pressure) and the hydrogen concentration as for the breathing of the cooling liquid storage container 4 in the cooling apparatus of the second embodiment. In this experiment, a prescribed flow amount of hydrogen is considered to be incorporated in the cooling liquid. In FIG. 7, a dot line shows a pressure within the container, and a real line shows a hydrogen concentration within the gas phase portion 42 of the cooling liquid storage container 4. When the fuel cell 1 having the cooling apparatus is operated at a stationary state, the demand output is changed to meet the demand power of the driving motor. Since the pressure of the supply air supplied to the fuel cell 1 is varied depending upon the demand output, the pressure within the cooling liquid storage container 4 is spontaneously changed as shown by the dot line in FIG. 7. As shown by the real ling in FIG. 7, with regard to the hydrogen within the gas phase portion of the cooling liquid storage container 4, since the gas in the cooling liquid is mixed with the supply air within the gas phase portion according to the pressure change (dot line) within the cooling liquid storage container 4, and since it is supplied to the cathode of the fuel cell 1 together with the supply air, the concentration of the hydrogen incorporated in the cooling liquid does not exceed the target concentration. However, when the change in the output of the fuel cell 1 is small (for example, the fuel cell carried vehicle is continuously driven at a constant speed), and the pressure of the air supplied to the fuel cell 1 is not changed or changed only in small degree (for example, section of from 15 minutes to 30 minutes in FIG. 7), the hydrogen concentration in the gas phase portion is sometimes increased. In this case, when the hydrogen concentration in the gas phase portion arrives at the target concentration detected by the means for detecting hydrogen gas (positions of 17 minutes, 24 minutes, and 26 minutes in FIG. 7), the rotation number of the air pump 7 is increased and then returned to the stationary rotation number, whereby the supply air is changed (the pressure is increased and then returned to the stationary state). The internal pressure within the container is varied as shown by a fat line in FIG. 7, and when the internal pressure within the container (PG)>the pressure of the supply gas (PA), the hydrogen is passed through the signal pressure pipe 5 and then exhausted into the supply air pipe 8, after which it is mixed with the supply air and then combusted at the cathode of the fuel cell 1. Then, the hydrogen within the gas phase portion 42 of the cooling liquid storage container 4 is decreased.

Figure 8:
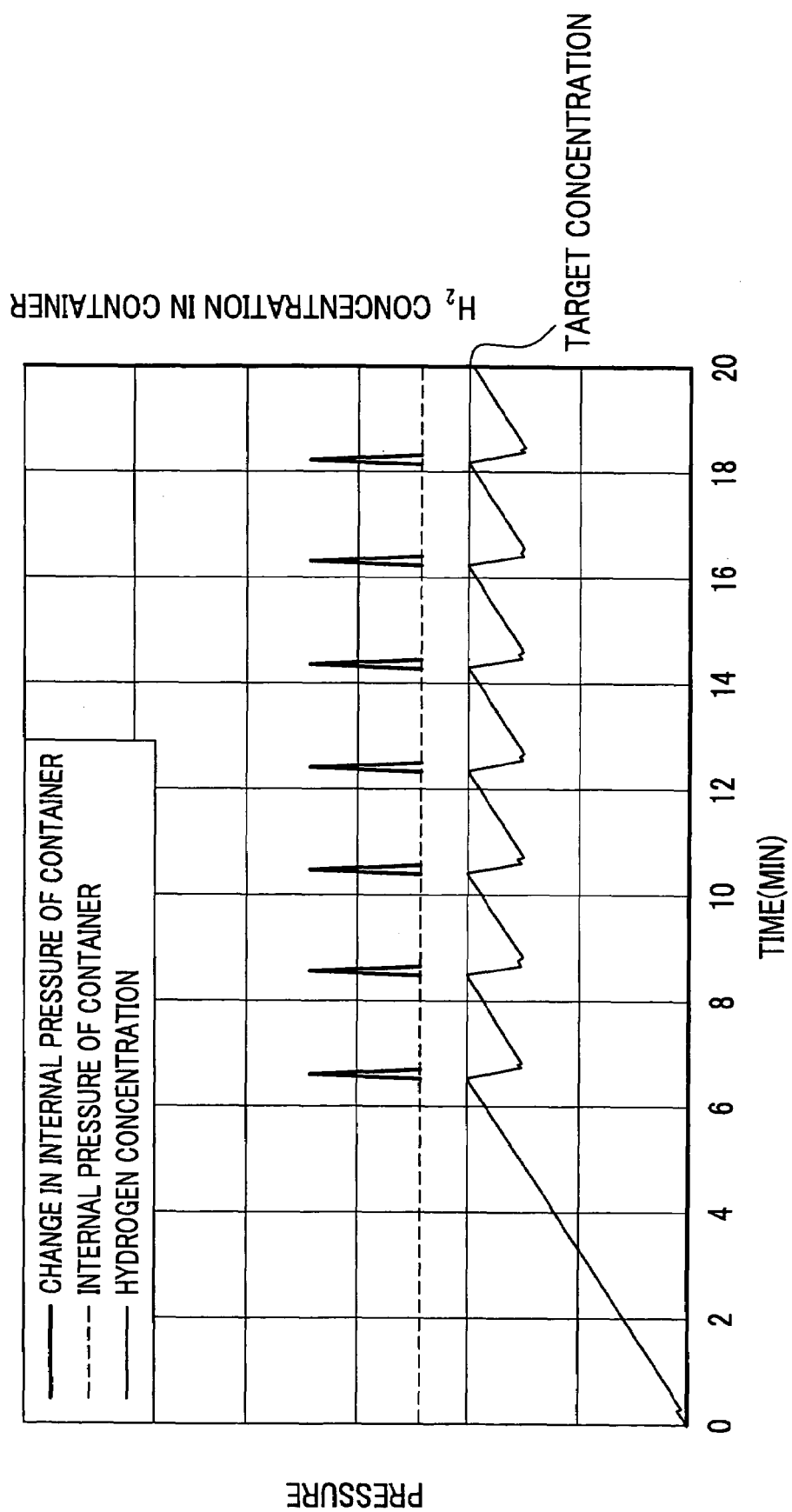
FIG. 8 shows variation in the pressure within the cooling liquid storage container and hydrogen concentration as for the breathing of the cooling liquid storage container in the cooling apparatus of the second embodiment.

FIG. 8 shows variation in the pressure within the cooling liquid storage container (internal pressure within the container) and hydrogen concentration as for the breathing of the cooling liquid storage container 4 in the cooling apparatus of the second embodiment. In FIG. 8, a dot line shows a pressure within the container, and a real line shows a hydrogen concentration within the gas phase portion 42 of the cooling liquid storage container 4. In the operation of the fuel cell having the cooling apparatus, when the internal pressure within the container is not changed, and when the hydrogen concentration within the gas phase portion 42 of the cooling liquid storage container 4 is changed to arrive at the prescribed target concentration measured by the hydrogen sensor 19 as shown in the real line, the air pump 7 is operated to change the pressure of the supply air (the pressure is increased and then returned). By this operation, the internal pressure within the container is changed as shown by a fat line in FIG. 8, and when the internal pressure within the container (PG) >the pressure of the supply gas (PA), the hydrogen is passed through the signal pressure pipe 5 and then exhausted into the supply air pipe 8, after which it is mixed with the supply air and then combusted at the cathode of the fuel cell 1. Then, the hydrogen within the gas phase portion 42 of the cooling liquid storage container 4 is decreased.

In this example, the pressure is changed when the hydrogen concentration in the gas phase portion arrives at the target concentration, the pressure may be periodically changed. Also, as shown in FIG. 8, when no pressure is changed at the stationary operation, the period when no pressure is changed may be detected, and the pressure may be changed depending upon the period.

It can be proven from the results of FIG. 7 and FIG. 8, according to the fuel cell having the apparatus for cooling a fuel cell of the present invention, the gas introduced from each of the parts making up the fuel cell into the cooling liquid, particularly the fuel gas, can be separated from the liquid within the cooling liquid storage container, and then exhausted to control the concentration of the fuel gas within the cooling liquid storage container to a desired level.

Example 2

Next, a fuel cell possessing a cooling apparatus having a configuration of the sixth embodiment and utilizing hydrogen as the fuel cell was carried on a vehicle, and the breathing of the cooling liquid storage container 4 was experimented. The results are shown in FIG. 9.

FIG. 9 shows change in the hydrogen concentration within the cooling liquid storage container at the time of driving a vehicle in which the fuel cell having the cooling apparatus is carried. At the time when the fuel cell 101 having the cooling apparatus operates at the stationary state, the demand output of the duel cell is changed depending upon the demand power of the driving motor of the fuel cell vehicle. Since the pressure of the supply air supplied to the fuel cell is changed depending upon the demand output of the fuel cell, the pressure within the cooling liquid storage container is spontaneously changed as shown by the thin line in FIG. 9. In FIG. 9, the dot line shows the change in the hydrogen concentration within the cooling liquid storage container when no gas exhaust mechanism is provided, and the fat line shows the change in the hydrogen concentration within the cooling liquid storage container when the gas exhaust mechanism according to the sixth embodiment is provided. In this experiment, a prescribed flow amount of hydrogen is considered to be incorporated in the cooling liquid.

In this cooling apparatus, as for the hydrogen concentration within the gas phase portion 142 of the cooling liquid storage container 104, since the gas in the cooling liquid is mixed with the supply air within the gas phase portion 142 according to the pressure change within the cooling liquid storage container 104, and since it is supplied to the cathode of the fuel cell 101 together with the supply air, the concentration of the hydrogen incorporated in the cooling liquid does not exceed the target concentration. However, when the change in the output of the fuel cell 1 is small (for example, the fuel cell carried vehicle is continuously driven at a constant speed), and the pressure of the air supplied to the fuel cell 1 is not changed or changed only in small degree, the hydrogen concentration in the gas phase portion 141 is increased as shown by the dot line in FIG. 9. In this case, in the sixth embodiment, since the ventilation by a prescribed flow amount of the ventilation current through the orifice is always performed in addition to the ventilation due to change in the pressure of the supply air, the hydrogen incorporated in the cooling liquid is diluted and exhausted. Consequently, in comparison with the hydrogen concentration (thin line) in the case having no gas exhaust mechanism, the hydrogen concentration (fat line) in the cooling liquid storage container is changed in a low concentration.

It can be proven from the results of FIG. 9 that according to the apparatus for cooling a fuel cell of the present invention the gas introduced from each of the parts making up the fuel cell into the cooling liquid, particularly the fuel gas, can be separated from the liquid within the cooling liquid storage container, and then the fuel gas within the cooling liquid storage container can be diluted with the supply air (or the exhaust air), and then exhausted out of the system.

What is claimed is:

1. An apparatus for cooling a fuel cell, which generates power by supplying air and a fuel gas, having a circulation passage for circulating a cooling liquid between the fuel cell and a heat exchanger, the apparatus comprising:
   a cooling liquid storage container, which stores at least a portion of the cooling liquid circulating within said circulation passage, and which communicates with said circulation passage via a gas drawing passage and via a passage for returning the cooling liquid;
   a supply air pipe which supplies air into the fuel cell;
   an air pump for supplying the air to the fuel cell via the supply air pipe; and
   a signal pressure pipe connected to a downstream side of the air pump and the cooling liquid storage container so that said cooling liquid storage container communicates with the supply air pipe,
   means for changing a pressure within the signal pressure pipe by changing a rotation speed of the air pump,
   wherein said signal pressure pipe communicates with said cooling liquid storage container and said supply air pipe to direct a fuel gas in said cooling liquid storage container to said supply air pipe, and
   wherein the air incorporated into said signal pressure pipe from the supply air pipe is pushed back towards said supply air pipe to be exhausted in said supply air pipe when a pressure of the fuel gas separated from the cooling liquid flowing from the circulation passage through said gas drawing passage and stored in said cooling liquid storage container is higher than a pressure of the supply air within said supply air pipe.

2. The apparatus according to claim 1, further comprising:
   means for changing the pressure of the air supplied into the fuel cell through the supply air pipe or the pressure of the air exhausted from the fuel cell through the exhaust air pipe whereby the gas is exhausted into said supply air pipe or said exhaust air pipe.

3. The apparatus according to claim 2, wherein said means are configured to increase the pressure within said signal pressure pipe to be not less than a prescribed pressure and then returned to the stationary pressure.

4. The apparatus according to claim 1, further comprising:
   means for changing the pressure of the air supplied into the fuel cell through the supply air pipe or the pressure of the air exhausted from the fuel cell through the exhaust air pipe when the pressure difference between the pressure of the gas within said cooling liquid storage container and the pressure within the air within the supply air pipe or between said cooling liquid storage container and the pressure within the exhaust air pipe is not changed over a prescribed period.

5. The apparatus according to claim 1, further comprising:
   means for changing the pressure of the air supplied to the fuel cell from the supply air pipe when the fuel gas concentration within said cooling liquid storage container is not less than a prescribed concentration.

6. The apparatus according to claim 1, wherein the pressure of the air supplied to the fuel cell from the supply air pipe is changed when the fuel gas concentration within said cooling liquid storage container is considered to be increased.

7. An apparatus for cooling a fuel cell, which generates power by supplying air and a fuel gas, having a circulation passage for circulating a cooling liquid between the fuel cell and a heat exchanger, the apparatus comprising:
   a cooling liquid storage container, which stores at least a portion of the cooling liquid circulating within said circulation passage;
   an air pump for supplying the air to the fuel cell; and
   a flow-in pipe connected to a downstream side of the air pump and the cooling liquid storage container, wherein a pressure in the flow-in pipe is changed by changing a rotation speed of the air pump, wherein said cooling liquid storage container includes
  a liquid phase portion that communicates with said circulation passage via a gas drawing passage, and
  a gas phase portion that communicates with a supply air pipe, which supplies the air into said fuel cell via the flow-in pipe, and which mixes a gas separated from the cooling liquid within said liquid phase portion with the air flowing therein through said flow-in pipe from said supply air pipe,
  wherein said flow-in pipe communicates with said cooling liquid storage container and said supply air pipe to direct the mixed gas in said gas phase portion of said cooling liquid storage container to said supply air pipe.

8. The apparatus according to claim 7, wherein said gas phase portion possesses means for detecting a fuel gas, which detects the internal fuel cell concentration.

9. The apparatus according to claim 8, which possesses pressure control means, which pushes back the gas within said gas phase portion to said supply gas pipe, when the fuel gas concentration within said gas phase portion is not less than a prescribed concentration.

10. The apparatus according to claim 9, wherein said pressure control means is means, which increases the pressure within said flow-in pipe to be not less than a prescribed pressure and then returns the pressure to a stationary pressure.

11. An apparatus for cooling a fuel cell, which generates power by supplying air and a fuel gas, having a circulation passage for circulating a cooling liquid between the fuel cell and a heat exchanger, the apparatus comprising:
  a cooling liquid storage container, which stores at least a portion of the cooling liquid circulating within said circulation passage;
  an air pump for supplying the air to the fuel cell; and
  a flow-in pipe connected to a downstream side of the air pump and the cooling liquid storage container, wherein a pressure in the signal pressure pipe is changed by changing a rotation speed of the air pump,
  wherein said cooling liquid storage container includes
    a liquid phase portion that communicates with said circulation passage via a gas drawing passage, and
    a gas phase portion which communicates with a supply air pipe, which supplies air into said fuel cell via the flow-in pipe and via a flow-out pipe, and which mixes a gas separated from the cooling liquid within said liquid phase portion with the air flowing therein through said flow-in pipe from said supply air pipe, and returns the mixed gas into said supply air pipe via said flow-out pipe,
  wherein said flow-in pipe and said flow-out pipe communicate with said cooling liquid storage container and said supply air pipe so that said flow-in pipe directs the air in said supply air pipe to said cooling liquid storage container and said flow-out pipe directs the mixed gas in said cooling liquid storage container to said supply air pipe,
  wherein said flow-in pipe communicates with said supply air pipe at an upstream portion of a humidifier, which is provided on the way to said supply air pipe and which humidifies the air to be supplied to said fuel cell, and said flow-out pipe communicates with said supply air pipe at a downstream of said humidifier.

12. The apparatus according to claim 11, wherein said cooling liquid storage container possesses means for detecting a fuel gas, which detects the internal fuel cell concentration.

13. An apparatus for cooling a fuel cell, which generates power by supplying air and a fuel gas, having a circulation passage for circulating a cooling liquid between the fuel cell and a heat exchanger, the apparatus comprising:
  a cooling liquid storage container, which stores at least a portion of the cooling liquid circulating within said circulation passage, communicates with said circulation passage via a gas drawing passage, and communicates with said circulation passage via a passage for returning a cooling liquid;
  an air pipe in which the air supplied to said fuel cell flows;
  an air pump for supplying the air to the fuel cell; and
  a ventilation pipe connected to a downstream side of the air pump and the cooling liquid storage container, wherein a pressure in the ventilation pipe is changed by changing a rotation speed of the air pump,
  wherein said cooling liquid storage container includes
    a gas exhaust mechanism, which communicates with said air pipe via the ventilation pipe, and which exhausts the fuel gas in said cooling liquid storage container out of the system by a ventilation current flowing within said ventilation pipe,
  wherein said ventilation pipe communicates with said cooling liquid storage container and said air pipe to direct the air in said air pipe to said cooling liquid storage container.

14. The apparatus according to claim 13, further comprising:
  means for controlling a flow amount of said ventilation current depending upon the fuel gas concentration within said cooling liquid storage container.

15. The apparatus according to claim 14, wherein said means are configured to increase a ventilation amount within said cooling liquid storage when the fuel gas concentration within said cooling liquid storage container arrives at a prescribed concentration or more.

16. The apparatus according to claim 15, wherein said gas exhaust mechanism is configured to exhaust the gas within said cooling liquid storage container when the pressure within said air pipe is increased whereby said fuel gas concentration within said cooling liquid storage container is decreased to a prescribed concentration.

17. The apparatus according to claim 14, wherein said means are configured to decrease the pressure within said cooling liquid storage container to increase the flow amount of said ventilation current when the fuel gas concentration within said cooling liquid storage container arrives at a prescribed concentration or more.

* * * * *